(12) United States Patent
Takita et al.

(10) Patent No.: US 8,406,626 B2
(45) Date of Patent: Mar. 26, 2013

(54) OPTICAL-NETWORK DESIGN APPARATUS

(75) Inventors: Yutaka Takita, Kawasaki (JP); Toru Katagiri, Kawasaki (JP); Tomohiro Hashiguchi, Kawasaki (JP); Kazuyuki Tajima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 364 days.

(21) Appl. No.: 12/801,899

(22) Filed: Jun. 30, 2010

(65) Prior Publication Data

US 2011/0008044 A1 Jan. 13, 2011

(30) Foreign Application Priority Data

Jul. 7, 2009 (JP) .................................. 2009-160526

(51) Int. Cl.
*H04B 10/20* (2006.01)
(52) U.S. Cl. ......................................................... 398/58
(58) Field of Classification Search .................... 398/58; 703/1, 7, 13, 21, 22
See application file for complete search history.

(56) References Cited

U.S. PATENT DOCUMENTS 7,096,173 B1 * 8/2006 Rappaport et al. .............. 703/13
7,218,851 B1 * 5/2007 Zang ................................ 398/33
2002/0118687 A1 * 8/2002 Chow et al. .................... 370/404
2006/0193638 A1 8/2006 Akiyama et al.

FOREIGN PATENT DOCUMENTS

| JP | 8-297591 | 11/1996 |
| JP | 2005/006604 | 1/2005 |

OTHER PUBLICATIONS

Patent Abstracts of Japan, Publication No. 08-297591, Published Nov. 12, 1996.

* cited by examiner

*Primary Examiner* — Dalzid Singh
(74) *Attorney, Agent, or Firm* — Staas & Halsey LLP

(57) ABSTRACT

An apparatus for designing an optical network having nodes, includes: a parameter holding unit which holds values of one or more optical-transmission parameters corresponding to one or more components constituting the optical network; a part generation unit which generates design candidates for a part to be arranged in each of one or more spans between the nodes so that each of the design candidates contains at least one of the one or more components; a part selection unit which makes a selection, for each of the one or more spans, of one of the design candidates which has at least one value of at least one of the one or more optical-transmission parameters satisfying a design condition; and a construction control unit which constructs the optical network by combining one or more parts each of which is selected by the part selection unit.

8 Claims, 14 Drawing Sheets

| Fiber-related Parameter | Component-related Parameter | Calculation Parameter |
|---|---|---|
| Fiber Type | Node Type | Noise Value |
| Fiber Length | Postamplifier Type | Dispersion Variation Value |
| Fiber Loss Value | Preamplifier Type | PMD Value |
| Fiber Dispersion Value | DCM Type | XT Value |
| ⋮ | ⋮ | ⋮ |

| | #1 | #2 | #3 | #4 | #5 | #6 | #7 | #8 | #9 | #10 | | | | | Min |
|---|---|---|---|---|---|---|---|---|---|---|---|---|---|---|---|
| Objective Function | 0 | 0 | 0 | 0 | 0 | 0 | 0 | 0 | 0 | 0 | 0 | 0 | | → | |
| Upper-limit of Dispersion demand1 | 45 | 50 | 40 | 40 | 0 | 0 | 0 | 0 | 0 | 0 | 0 | 0 | $s_1$ | ≤ | 1000 |
| Upper-limit of Dispersion demand2 | 45 | 50 | 40 | 40 | 50 | 15 | 18 | 15 | 20 | 25 | 0 | 0 | $s_2$ | ≤ | 900 |
| Lower-limit of Dispersion demand1 | 0 | 5 | 0 | 10 | 50 | 0 | 0 | 0 | 0 | 0 | 0 | 0 | $s_3$ | ≥ | −100 |
| Lower-limit of Dispersion demand2 | 0 | 5 | 0 | 10 | 0 | 5 | −3 | 5 | 2 | 5 | 0 | 0 | $s_4$ | ≥ | −70 |
| Q Value demand1 | 25 | 23 | 18 | 20 | 22 | 0 | 0 | 0 | 0 | 0 | 0 | 0 | $s_5$ | ≤ | 40 |
| Q Value demand2 | 25 | 23 | 18 | 20 | 22 | 25 | 23 | 18 | 20 | 22 | 0 | 0 | $s_6$ | ≤ | 40 |
| PMD demand1 | 8 | 6 | 4 | 2 | 1 | 0 | 0 | 0 | 0 | 0 | 0 | 0 | $s_7$ | ≤ | 10 |
| PMD demand2 | 8 | 6 | 4 | 2 | 1 | 8 | 6 | 4 | 2 | 1 | 0 | 0 | $s_8$ | ≤ | 10 |
| XT demand1 | 1 | 2 | 3 | 4 | 5 | 0 | 0 | 0 | 0 | 0 | 0 | 0 | $s_9$ | ≤ | 8 |
| XT demand2 | 1 | 2 | 3 | 4 | 5 | 1 | 2 | 3 | 4 | 5 | 0 | 0 | $s_{10}$ | ≤ | 8 |
| Span Constraint Sp1 | 1 | 1 | 1 | 1 | 1 | 0 | 0 | 0 | 0 | 0 | 0 | 0 | negError | = | 1 |
| Span Constraint Sp2 | 0 | 0 | 0 | 0 | 0 | 1 | 1 | 1 | 1 | 1 | 1 | 0 | posError | = | 1 |
| Qtotal negative side | 25 | 23 | 18 | 20 | 22 | 25 | 23 | 18 | 20 | 22 | 0 | 0 | | ≥ | 40 |
| Qtotal positive side | 25 | 23 | 18 | 20 | 22 | 25 | 23 | 18 | 20 | 22 | 0 | −1 | | ≤ | 40 | ized and attained by means of the elements and combinations
particularly pointed out in the claims.

OPTICAL-NETWORK DESIGN APPARATUS

CROSS-REFERENCE TO RELATED APPLICATION(S)

This application is based upon and claims the benefits of priority from the prior Japanese Patent Application No. 2009-160526, filed on Jul. 7, 2009, the entire contents of which are incorporated herein by reference.

FIELD

The present invention relates to an apparatus and a method for designing an optical network.

BACKGROUND

Currently, optical networks having complex topological structures such as interconnected ring networks and mesh networks are constructed by use of OADMs (optical add drop multiplexer), WXCs (wavelength cross-connects), and the like. The OADMs insert (add) and remove (drop) optical signals into (to) and from a multiplexed optical signal on a wavelength-by-wavelength basis, and the WXCs switch paths of optical signals on a wavelength-by-wavelength basis.

In the above situation, demands for a tool for performing efficient design of an optical network including optimum design of arrangement of various devices such as dispersion compensators are increasing.

According to some conventionally proposed techniques, the amounts of dispersion compensation by dispersion compensators arranged in respective paths are set so that the residual dispersion in each path is within a tolerance of the residual dispersion. For example, see Japanese Republication of International Patent Publication WO2005/006604, page 6, line 46 to page 8, line 26, and Japanese Laid-open Patent Publication No. 8-297591, paragraph Nos. 0009 to 0012 and FIG. 1.)

However, according to the mainstream techniques used in the conventional tools for designing an optical network, an optical network is designed in consideration of only one design item as a target as in the above-mentioned conventionally proposed techniques (in which the residual dispersion is controlled within a predetermined range). Therefore, conventionally, it is impossible to efficiently design an optical network having one or more desired characteristics by concurrently considering a plurality of design items.

SUMMARY

According to an aspect of the present invention, an optical-network design apparatus for designing an optical network having nodes, includes: a parameter holding unit which holds values of one or more optical-transmission parameters corresponding to one or more components constituting the optical network; a part generation unit which generates design candidates for a part to be arranged in each of one or more spans between the nodes so that each of the design candidates contains at least one of the one or more components; a part selection unit which makes a selection, for each of the one or more spans, of one of the design candidates which has at least one value of at least one of the one or more optical-transmission parameters satisfying a design condition; and a construction control unit which constructs the optical network by combining one or more parts each of which is selected by the part selection unit.

The objects and advantages of the invention will be realized and attained by means of the elements and combinations particularly pointed out in the claims.

It is to be understood that both the forgoing general description and the following detailed description are exemplary and explanatory and are not restrictive of the invention, as claimed.

BRIEF DESCRIPTION OF THE DRAWING(S)

FIG. 1 illustrates an outline of a construction of an embodiment of an optical-network design apparatus;

FIG. 2 schematically illustrates operations performed by the optical-network design apparatus for designing an example of an optical network;

FIG. 3 indicates an entire sequence of operations of the optical-network design apparatus for designing an optical network;

FIG. 4 schematically illustrates operations of generating parts for each span in an example of an optical network;

FIG. 5 schematically illustrates the components in the part p1-1, and tabulates optical-transmission parameters;

FIG. 6 schematically illustrates an example of selection of an optimum part from among a plurality of candidates for each span;

Figure 12:
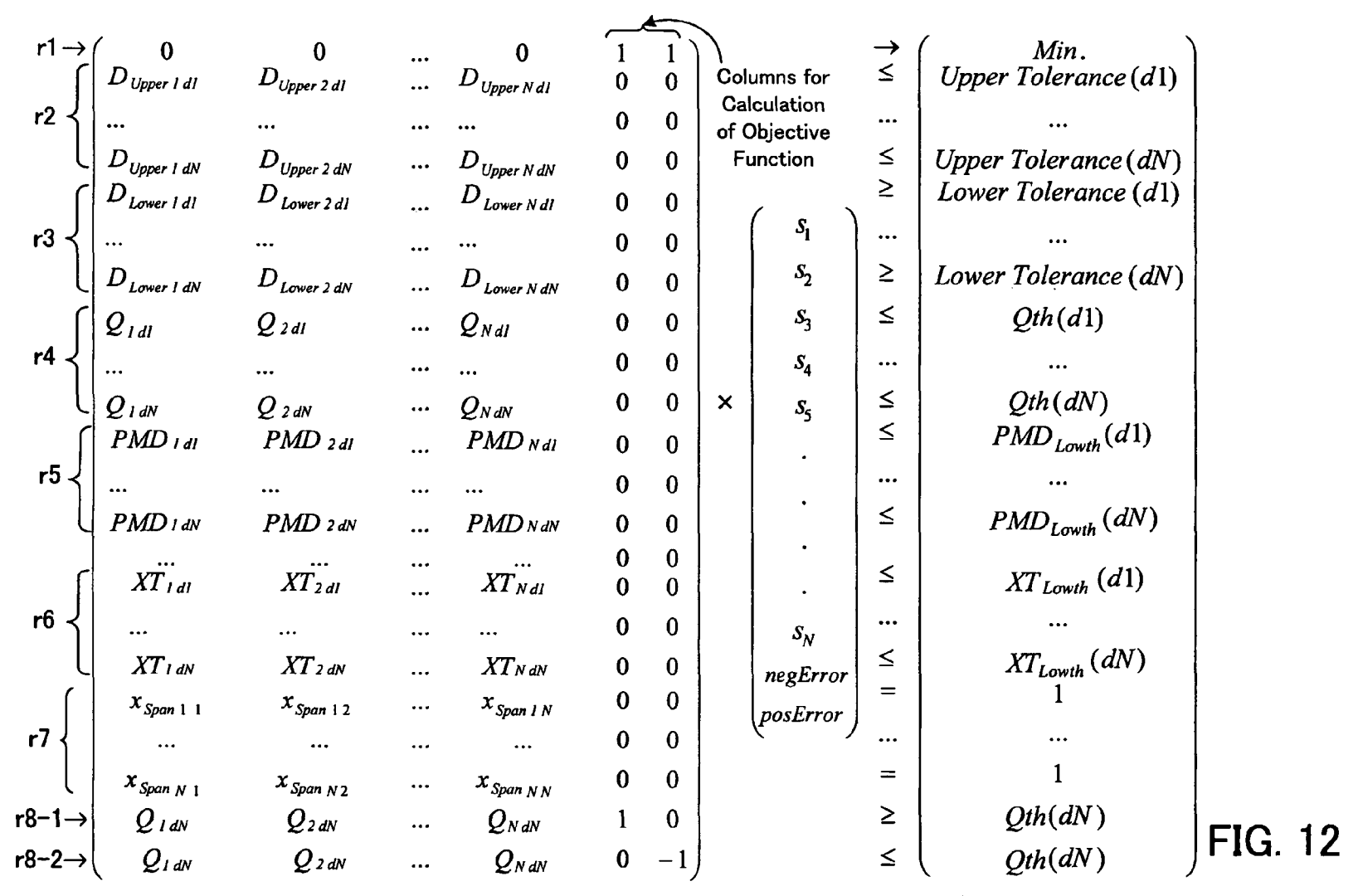
Figure 13:
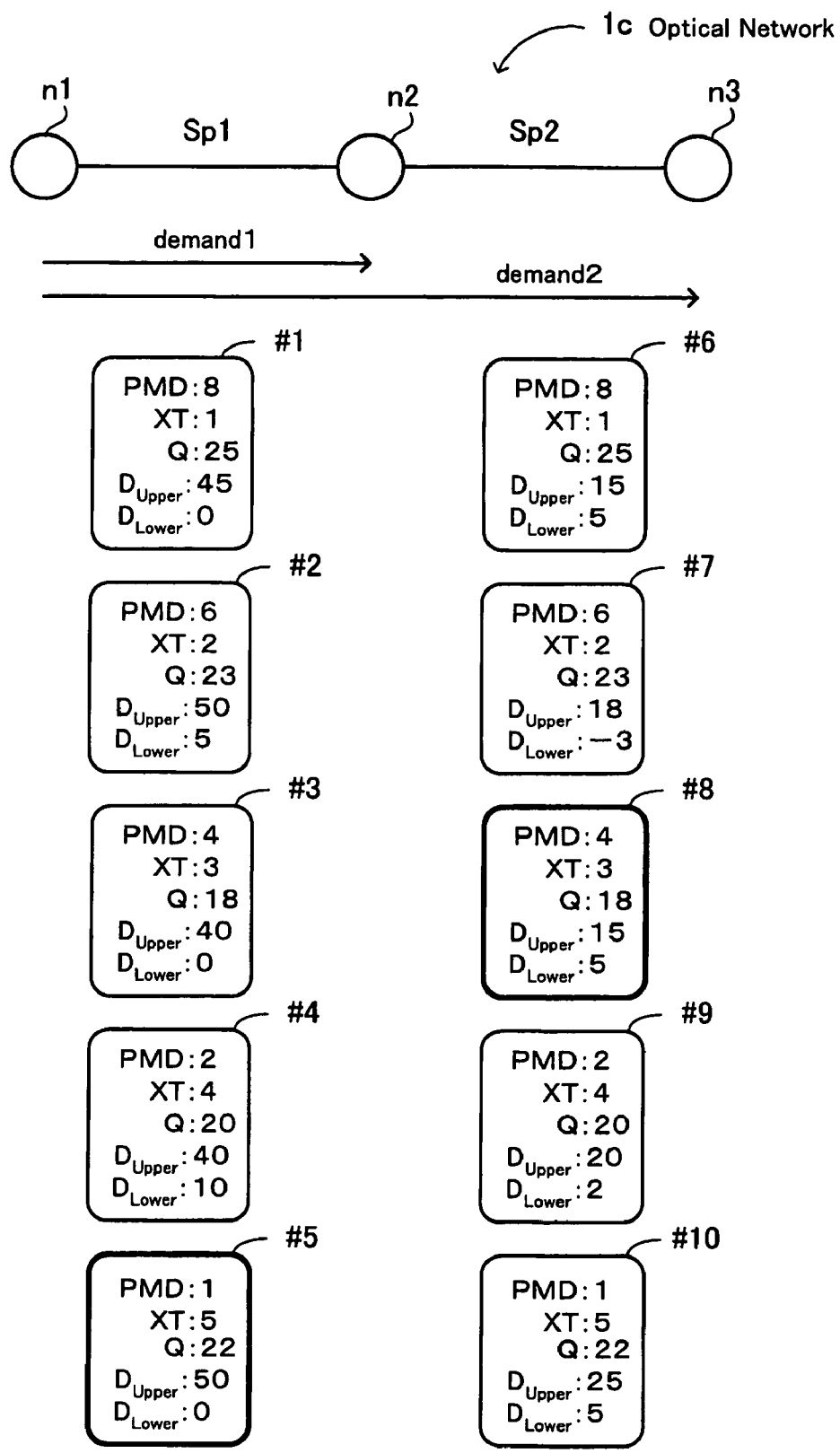

FIG. 12 indicates a matrix representation of conditional inequalities and conditional equations;

FIG. 13 indicates an optical network constituted by two spans, and values of optical-transmission parameters in candidate parts; and FIG. 14 indicates a matrix representation for calculation.

DESCRIPTION OF EMBODIMENT(S)

The embodiments will be explained below with reference to the accompanying drawings, wherein like reference numbers refer to like elements throughout.

1. Outline of Construction

Figure 1:
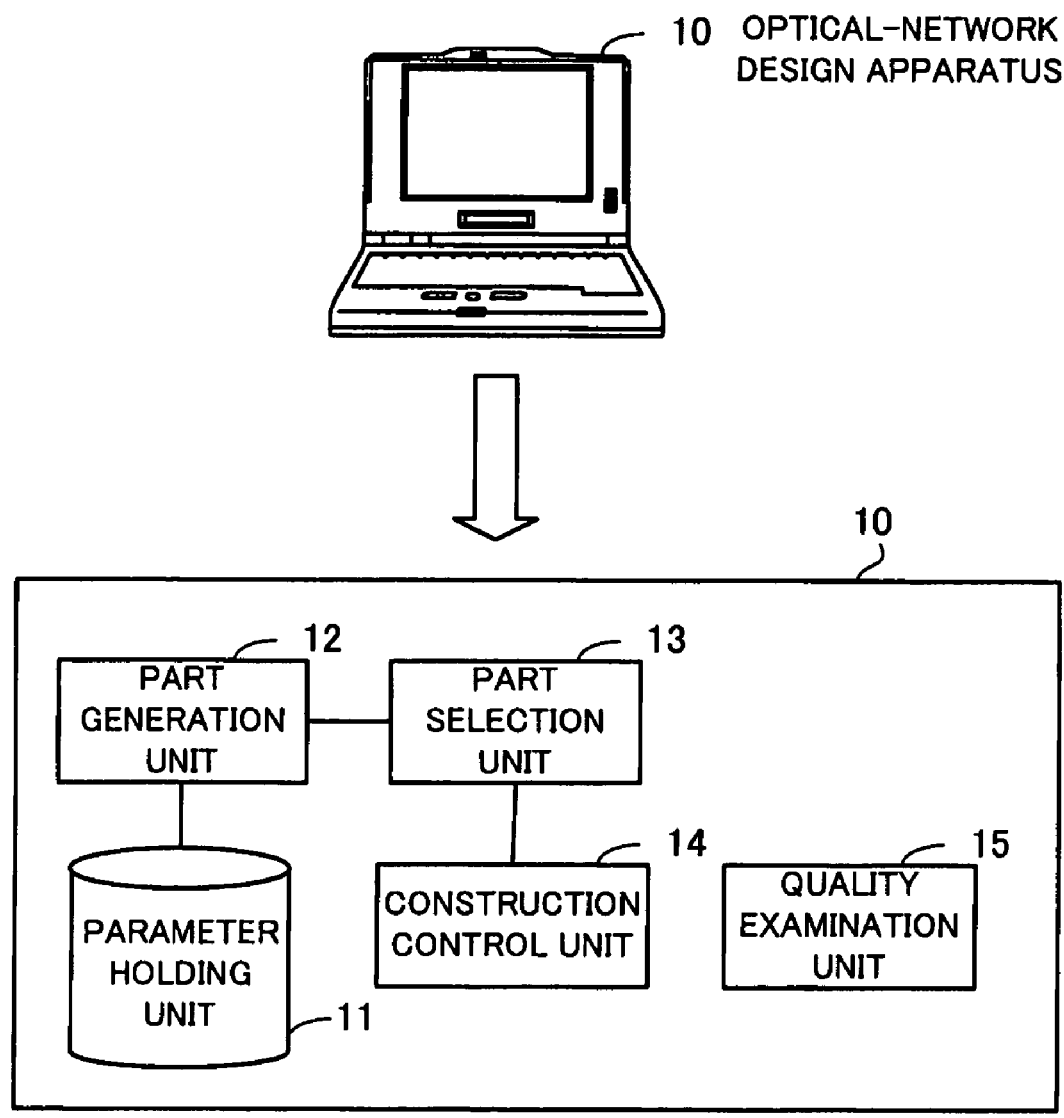

FIG. 1 illustrates an outline of a construction of an embodiment of an optical-network design apparatus. The optical-network design apparatus 10 of FIG. 1 comprises an (optical-transmission) parameter holding unit 11, a part generation unit 12, a part selection unit 13, a construction control unit 14, and a quality examination unit 15. In addition, the optical-network design apparatus 10 has a user-interface function of receiving data inputted by a (network) designer and displaying data to the designer.

The parameter holding unit 11 holds optical-transmission parameters corresponding to components constituting the optical network (which is to be designed). The optical-transmission parameters are inputted by the designer in advance. (Various types of optical-transmission parameters are explained later with reference to FIG. 5.) The part generation unit 12 generates a plurality of design candidates for a part to be arranged in each of spans between the nodes so that each of the plurality of design candidates contains one or more of the components of the optical network. (Hereinafter, the design candidates for a part to be arranged in a span may be referred to as candidate parts for a span or may be simply referred to as parts for a span.) The part selection unit 13 selects for each of the spans one of the candidate parts which has one or more values of one or more optical-transmission parameters satisfying a design condition. The construction control unit 14 constructs the optical network by combining parts each of which is selected by the part selection unit as one of candidate parts. The quality examination unit 15 performs a quality examination of software for designing the optical network in order to confirm the reliability of the optical network after the design is completed, where the software includes at least one of the part generation unit 12, the part selection unit 13, and the construction control unit 14.

2. Operations

Figure 2:
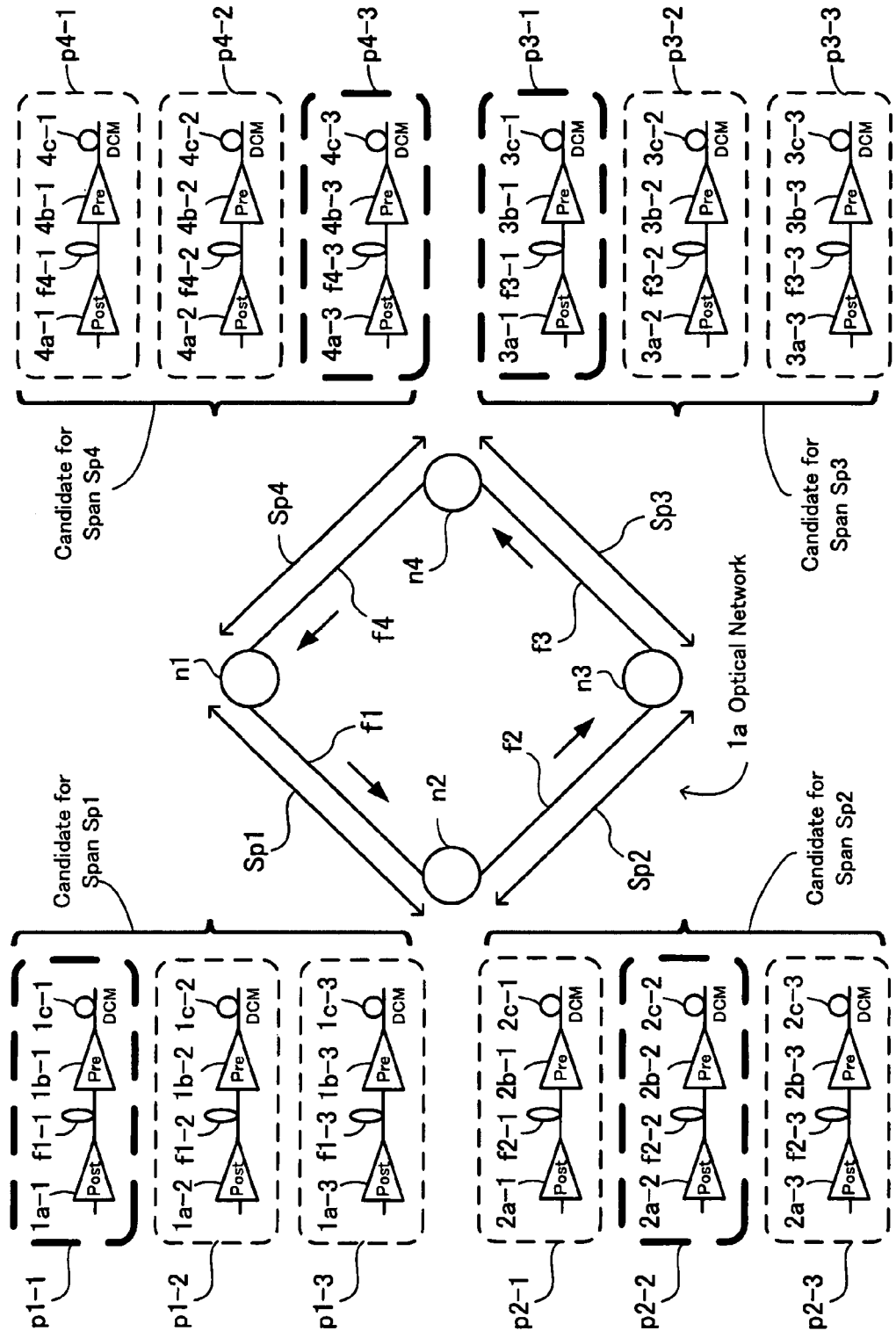

Next, operations of the optical-network design apparatus 10 for designing an optical network are explained by example. FIG. 2 schematically illustrates operations performed by the optical-network design apparatus 10 for designing an example of an optical network. In FIG. 2, the optical network 1*a* includes nodes n1 to n4. The nodes n1 and n2 are connected through an optical fiber f1, the nodes n2 and n3 are connected through an optical fiber f2, the nodes n3 and n4 are connected through an optical fiber f3, and the nodes n4 and n1 are connected through an optical fiber f4. In the following explanations, a design is made for optical transmission in the anticlockwise direction in the optical network 1*a*.

In the above case, the part generation unit generates a plurality of design candidates for a part to be arranged in each of the spans Sp1 to Sp4 between the nodes, where each of the design candidates for the part contains one or more components for the corresponding span. The part selection unit 13 selects for each of the spans one of the plurality of candidate parts which contains one or more components having one or more optical-transmission parameters satisfying a desired condition. The construction control unit 14 optimumly designs arrangement of various devices in the optical network 1*a*, by combining (candidate) parts each of which is selected by the part selection unit 13.

For example, the candidate parts p1-1 to p1-3 are prepared for the span Sp1. The candidate part p1-1 contains as components a postamplifier 1*a*-1, an optical fiber f1-1, a preamplifier 1*b*-1, and a dispersion compensation module (DCM) 1*c*-1. The candidate part p1-2 contains as components a postamplifier 1*a*-2, an optical fiber f1-2, a preamplifier 1*b*-2, and a DCM 1*c*-2. The candidate part p1-3 contains as components a postamplifier 1*a*-3, an optical fiber f1-3, a preamplifier 1*b*-3, and a DCM 1*c*-3. The postamplifiers 1*a*-1 to 1*a*-3 are candidates for a postamplifier to be arranged in an optical transmitter in the node n1, and the optical fibers f1-1 to f1-3 are candidates for the optical fiber f1. The preamplifiers 1*b*-1 to 1*b*-3 are candidates for a preamplifier to be arranged in the optical receiver in the node n2, and the DCMs 1*c*-1 to 1*c*-3 are candidates for a DCM to be arranged in the optical receiver in the node n2.

The candidate parts p2-1 to p2-3 are prepared for the span Sp2. The candidate part p2-1 contains as components a postamplifier 2*a*-1, an optical fiber f2-1, a preamplifier 2*b*-1, and a DCM 2*c*-1. The candidate part p2-2 contains as components a postamplifier 2*a*-2, an optical fiber f2-2, a preamplifier 2*b*-2, and a DCM 2*c*-2. The candidate part p2-3 contains as components a postamplifier 2*a*-3, an optical fiber f2-3, a preamplifier 2*b*-3, and a DCM 2*c*-3. The postamplifiers 2*a*-1 to 2*a*-3 are candidates for a postamplifier to be arranged in an optical transmitter in the node n2, and the optical fibers f2-1 to f2-3 are candidates for the optical fiber f2. The preamplifiers 2*b*-1 to 2*b*-3 are candidates for a preamplifier to be arranged in the optical receiver in the node n3, and the DCMs 2*c*-1 to 2*c*-3 are candidates for a DCM to be arranged in the optical receiver in the node n3.

The candidate parts p3-1 to p3-3 are prepared for the span Sp3. The candidate part p3-1 contains as components a postamplifier 3*a*-1, an optical fiber f3-1, a preamplifier 3*b*-1, and a DCM 3*c*-1. The candidate part p3-2 contains as components a postamplifier 3*a*-2, an optical fiber f3-2, a preamplifier 3*b*-2, and a DCM 3*c*-2. The candidate part p3-3 contains as components a postamplifier 3*a*-3, an optical fiber f3-3, a preamplifier 3*b*-3, and a DCM 3*c*-3. The postamplifiers 3*a*-1 to 3*a*-3 are candidates for a postamplifier to be arranged in an optical transmitter in the node n3, and the optical fibers f3-1 to f3-3 are candidates for the optical fiber f3. The preamplifiers 3*b*-1 to 3*b*-3 are candidates for a preamplifier to be arranged in the optical receiver in the node n4, and the DCMs 3*c*-1 to 3*c*-3 are candidates for a DCM to be arranged in the optical receiver in the node n4.

The candidate parts p4-1 to p4-3 are prepared for the span Sp4. The candidate part p4-1 contains as components a postamplifier 4*a*-1, an optical fiber p4-1, a preamplifier 4*b*-1, and a DCM 4*c*-1. The candidate part p4-2 contains as components a postamplifier 4*a*-2, an optical fiber p4-2, a preamplifier 4*b*-2, and a DCM 4*c*-2. The candidate part p4-3 contains as components a postamplifier 4*a*-3, an optical fiber f4-3, a preamplifier 4*b*-3, and a DCM 4*c*-3. The postamplifiers 4*a*-1 to 4*a*-3 are candidates for a postamplifier to be arranged in an optical transmitter in the node n4, and the optical fibers p4-1 to p4-3 are candidates for the optical fiber f4. The preamplifiers 4*b*-1 to 4*b*-3 are candidates for a preamplifier to be arranged in the optical receiver in the node n1, and the DCMs 4*c*-1 to 4*c*-3 are candidates for a DCM to be arranged in the optical receiver in the node n1.

The part selection unit 13 selects for each of the spans a part satisfying a desired condition from among the above candidate parts. Each optical-transmission parameter of each component has different values in different parts for each span. In the example of FIG. 2, the part p1-1 is selected from among the candidate parts p1-1 to p1-3 in the span Sp1, the part p2-2 is selected from among the candidate parts p2-1 to p2-3 in the span Sp2, the part p3-1 is selected from among the candidate parts p3-1 to p3-3 in the span Sp3, and the part p4-3 is selected from among the candidate parts p4-1 to p4-3 in the span Sp4. Therefore, the components contained in the part p1-1 are arranged in the span Sp1, the components contained in the part p2-2 are arranged in the span Sp2, the components contained in the part p3-1 are arranged in the span Sp3, and the components contained in the part p4-3 are arranged in the span Sp4.

Specifically, the part generation unit 12 prepares, for the optical network to be designed, a plurality of candidate parts by dividing candidate components into the spans. Then, the part selection unit 13 obtains an appropriate construction of the optical network (for example, a construction which realizes one or more transmission characteristics in a vicinity of a limit of normal transmission) by calculation in accordance with linear (integer) programming.

Thereafter, the construction control unit 14 determines whether or not the combined parts satisfy the desired condition. When no is determined, one or more characteristics of the components in the parts are finely tuned (as explained in detail later).

Since the optical-network design apparatus 10 optimumly designs an optical network by concurrently selecting parts satisfying the desired condition, from among candidate parts which are prepared in advance in correspondence with the spans. Therefore, an optical network having one or more desired characteristics can be efficiently designed by concurrently considering a plurality of design items such as arrangement of amplifiers and DCMs, so that the man-hours needed for designing the optical network can be greatly reduced.

In the above explanations, each part is assumed to contain only a postamplifier, an optical fiber, and a DCM as representative components for simplification of the explanations. However, arbitrary components may be contained in each part, and arranged in various manners. In other words, each part may not contain all of the postamplifier, optical fiber, preamplifier, and DCM, and may contain other components such as an optical filter. In addition, different parts may contain different components.

Further, the respective components bearing different reference numbers in the above explanations may have different characteristics, or identical components may be contained in different parts. For example, the candidate parts p1-1 and p1-2 may be configured in such a manner that the postamplifier 1$a$-1 in the candidate part p1-1 and the postamplifier 1$a$-2 in the candidate part p1-2 are identical, the preamplifier 1$b$-1 in the candidate part p1-1 and the preamplifier 1$b$-2 in the candidate part p1-2 are identical, the DCM 1$c$-1 in the candidate part p1-1 and the DCM 1$c$-2 in the candidate part p1-2 are identical, and the optical fiber f1-1 in the candidate part p1-1 and the optical fiber f1-2 in the candidate part p1-2 are different (for example, in the fiber type and the fiber length).

3. Other Features

Other features of the optical-network design apparatus 10 are explained below. Although various design requirements can be imposed on the designing of the optical network, there can be a requirement that an optical network be designed in a vicinity of a limit of a certain transmission characteristic. For example, for the purpose of minimization of the cost, an optical network can be required to be constructed in accordance with such a design that the optical network has a transmission characteristic as close as possible to a limit of normal transmission.

In the conventional designing of an optical network, it is necessary to originate a plurality of network constructions having various transmission characteristics, and perform a simulation or the like for determining whether or not each network construction realizes operations in a vicinity of the limit of normal transmission. That is, the conventional designing of an optical network is very laborious, and needs much time and a great number of man-hours. On the other hand, the optical-network design apparatus 10 according to the present embodiment enables precise and efficient designing of a desired construction of an optical network having one or more transmission characteristics near the limit of normal transmission.

In addition, conventionally, there is no design tool having a function of determining whether or not the designed optical network is reliable. Therefore, conventionally, it is impossible to efficiently determine whether or not the optical network automatically designed by use of the conventional design tool is really reliable and really enables optical transmission with one or more desired characteristics. On the other hand, the optical-network design apparatus 10 according to the present embodiment has the function of examining the quality of the software which includes the functions for designing an optical network. Therefore, it is possible to improve the reliability of the functions of the optical-network design apparatus 10 per se, and therefore improve the reliability of the optical network designed by use of the optical-network design apparatus 10.

4. Sequence of Operations

Figure 3:
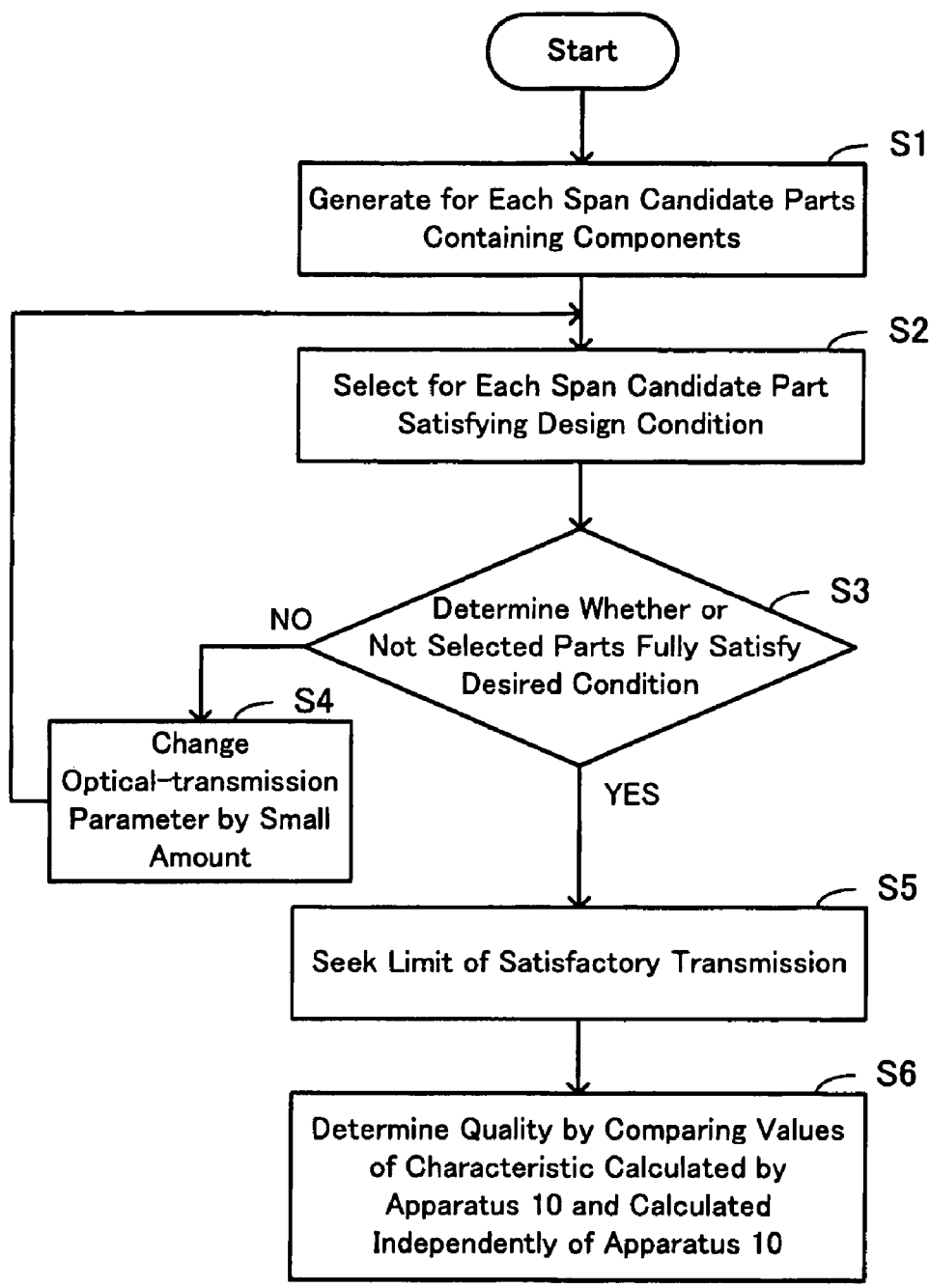

The entire sequence of operations of the optical-network design apparatus 10 for designing an optical network is explained below with reference to FIG. 3, which indicates the sequence. In the sequence of FIG. 3, steps S1 to S4 correspond to the operations for designing the optical network, and steps S5 and S6 correspond to operations for examining the quality of the software installed in the optical-network design apparatus 10.

<Step S1> The part generation unit 12 generates for each span a plurality of candidate parts each of which contains one or more of the components of the optical network.

<Step S2> The part selection unit 13 selects for each span an optimum one of the candidate parts which satisfies a design condition (i.e., one of the candidate parts which has one or more transmission characteristics near one or more target transmission characteristics).

<Step S3> The construction control unit 14 determines whether or not the selected parts fully satisfy the desired condition. For example, the construction control unit 14 determines whether or not one or more transmission characteristics of the optical network constructed of the selected parts can realize normal optical transmission and the one or more transmission characteristics of the optical network are near the limit of the normal optical transmission. When no is determined (i.e., when the one or more transmission characteristics of the optical network are not near the limit of normal optical transmission or when the one or more transmission characteristics of the optical network are out of a range in which the normal transmission is possible), the operation goes to step S4. When yes is determined (i.e., when the one or more transmission characteristics of the optical network are near the limit of the normal optical transmission within the range in which the normal transmission is possible), the operation goes to step S5. The value or values of the one or more transmission characteristics near the limit of the normal optical transmission are set in advance by the network designer.

<Step S4> The construction control unit 14 changes one or more optical-transmission parameters corresponding to one or more components contained in one or more selected parts by a small amount, and the operation goes back to step S2. In this stage, the designing of the optical network which satisfies the desired condition is provisionally completed.

<Step S5> The quality examination unit 15 selects for the designed optical network one or more predetermined optical-transmission parameters corresponding to one or more predetermined parts constituting the designed optical network, and seeks the limit of the transmission satisfying the desired condition by moving (changing) the value of each of the one or more predetermined optical-transmission parameters.

<Step S6> The quality examination unit 15 calculates a first value of a characteristic at a first point on a first side of a limit of normal transmission on which the normal transmission is possible and a second value of the characteristic at a second point on the opposite side of the limit of normal transmission on which the normal transmission is impossible, compares the first value with an expected value of the characteristic at the first point, and compares the second value with an expected value of the characteristic at the second point, where the expected values at the first and second points are obtained in advance independently of the optical-network design apparatus 10. When the values of the characteristic calculated by the quality examination unit 15 are respectively identical to the expected values at both of the first and second points, the quality examination unit 15 determines the examination result to be satisfactory. When the characteristic value calculated by the quality examination unit 15 is different from the expected value at either of the first and second points, the quality examination unit 15 determines the examination result to be unsatisfactory. (The above operations of the quality examination unit 15 are explained in detail later with reference to FIG. 7.)

5. Operations

Figure 4:
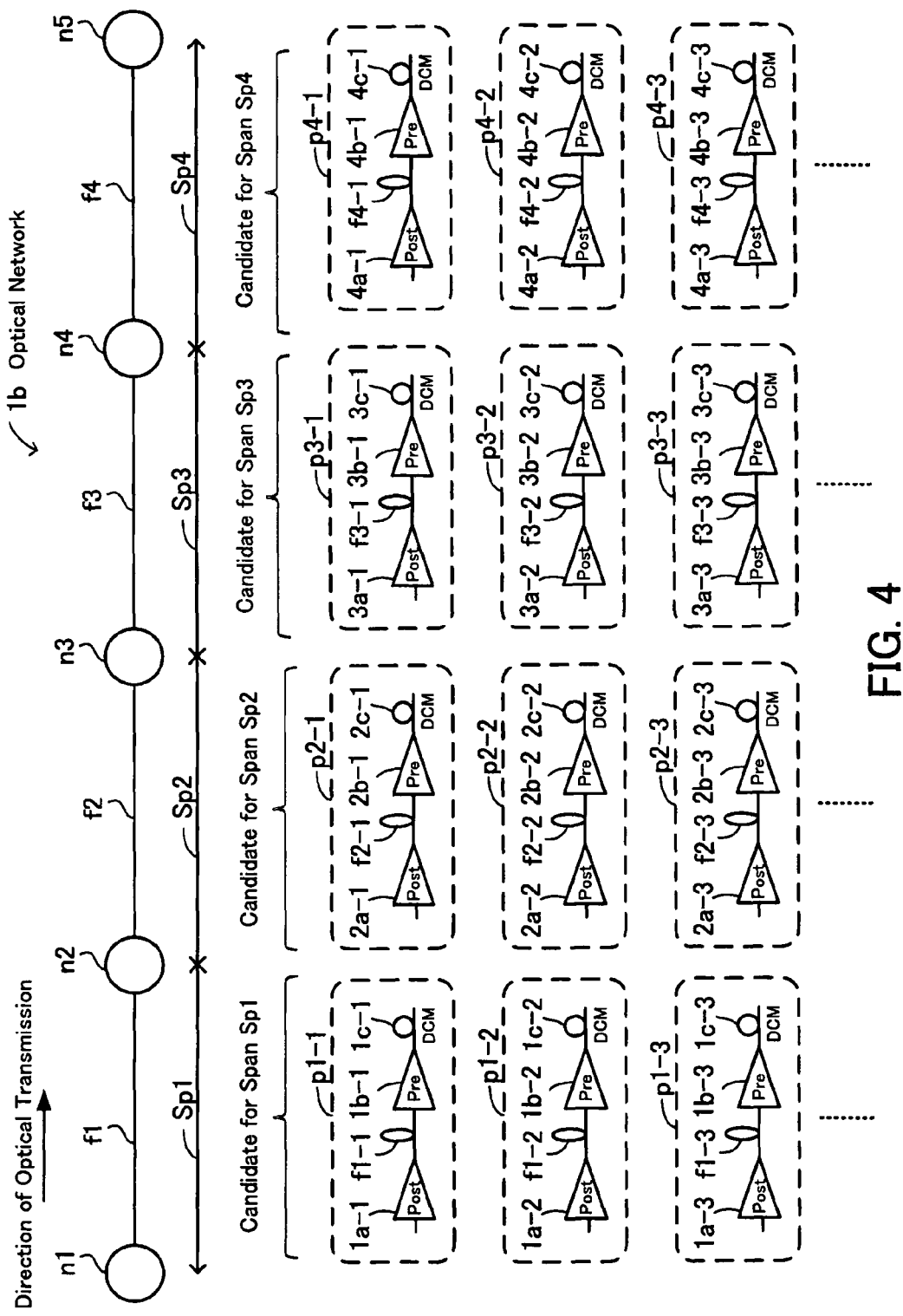

Next, details of the operations of the optical-network design apparatus 10 are explained below by using another example. FIG. 4 schematically illustrates operations of generating parts for each span in an example of an optical network. In the optical network 1b illustrated in FIG. 4, the nodes n1 to n5 are serially connected. In the following explanations, a design is made for optical transmission through the optical network 1b in the direction from the node n1 to the node n5.

The optical network 1b contains the nodes n1 to n5. The nodes n1 and n2 are connected through the optical fiber f1, the nodes n2 and n3 are connected through the optical fiber f2, the nodes n3 and n4 are connected through the optical fiber f3, and the nodes n4 and n5 are connected through the optical fiber f4.

In the above case, the optical-network design apparatus 10 prepares a plurality of design candidates for a part to be arranged in each of the spans Sp1 to Sp4 between the nodes. The candidate parts p1-1 to p1-3 are prepared for the span Sp1 the candidate parts p2-1 to p2-3 are prepared for the span Sp2, the candidate parts p3-1 to p3-3 are prepared for the span Sp3, and the candidate parts p4-1 to p4-3 are prepared for the span Sp4.

Each part contains as components a postamplifier, an optical fiber, a preamplifier, and a dispersion compensation module (DCM) in a similar manner to the example of FIG. 2. Therefore, the explanations on the internal structure of each part are not repeated. For the span Sp1, the postamplifiers 1a-1 to 1a-3 are candidates for a postamplifier to be arranged in an optical transmitter in the node n1, the optical fibers f1-1 to f1-3 are candidates for the optical fiber f1, the preamplifiers 1b-1 to 1b-3 are candidates for a preamplifier to be arranged in the optical receiver in the node n2, and the DCMs 1c-1 to 1c-3 are candidates for a DCM to be arranged in the optical receiver in the node n2. For the span Sp2, the postamplifiers 2a-1 to 2a-3 are candidates for a postamplifier to be arranged in an optical transmitter in the node n2, the optical fibers f2-1 to f2-3 are candidates for the optical fiber f2, the preamplifiers 2b-1 to 2b-3 are candidates for a preamplifier to be arranged in the optical receiver in the node n3, and the DCMs 2c-1 to 2c-3 are candidates for a DCM to be arranged in the optical receiver in the node n3. For the span Sp3, the postamplifiers 3a-1 to 3a-3 are candidates for a postamplifier to be arranged in an optical transmitter in the node n3, the optical fibers f3-1 to f3-3 are candidates for the optical fiber f3, the preamplifiers 3b-1 to 3b-3 are candidates for a preamplifier to be arranged in the optical receiver in the node n4, and the DCMs 3c-1 to 3c-3 are candidates for a DCM to be arranged in the optical receiver in the node n4. For the span Sp4, the postamplifiers 4a-1 to 4a-3 are candidates for a postamplifier to be arranged in an optical transmitter in the node n4, the optical fibers f4-1 to f4-3 are candidates for the optical fiber f4, the preamplifiers 4b-1 to 4b-3 are candidates for a preamplifier to be arranged in the optical receiver in the node n5, and the DCMs 4c-1 to 4c-3 are candidates for a DCM to be arranged in the optical receiver in the node n5.

Figure 5:
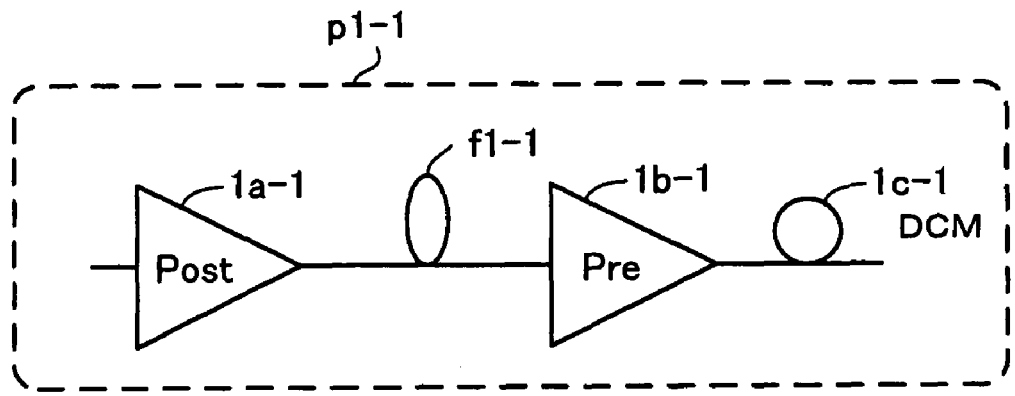
Figure 5:

FIG. 5 schematically illustrates the components in the part p1-1, and tabulates optical-transmission parameters. The part p1-1 contains as components the postamplifier 1a-1, the optical fiber f1-1, the preamplifier 1b-1, and the DCM 1c-1.

The optical-transmission parameters corresponding to the above components are stored in the parameter holding unit 11. The optical-transmission parameters include, for example, fiber-related parameters, component-related parameters, and calculation parameters. The fiber-related parameters include, for example, a fiber type, a fiber length, a fiber loss value, a fiber dispersion value, and the like. The component-related parameters include, for example, a node type, a postamplifier type, a preamplifier type, a DCM type, and the like. The calculation parameters include, for example, a noise value, dispersion variation values (an upper-limit value of dispersion and a lower-limit value of dispersion), a PMD (polarization mode dispersion) value, an XT (cross talk) value, and the like. In addition, in the case where the components in a part include an optical filter (which is arranged, for example, in the stage following the DCM), a PBN (passband narrowing) value is included as an optical-transmission parameter corresponding to the optical filter. All of the above optical-transmission parameters are stored in numerical form in the parameter holding unit 11.

As described above, a plurality of parts are considered for each of a plurality of spans of an optical network to be designed, and different values of each optical-transmission parameter (such as the fiber type, the fiber length, the amplifier type, or the DCM type) are set for each part for preparation of design candidates.

The part generation unit 12 uses the above values of the optical-transmission parameters stored in the parameter holding unit 11, and generates the plurality of parts for each span, where the optical-transmission parameters in different parts have different values. Thus, the plurality of parts which contain components having various values of optical-transmission parameters are generated for each span. Therefore, the wide range of selection of the optical-transmission parameters enables flexible design of the optical network.

Figure 6:
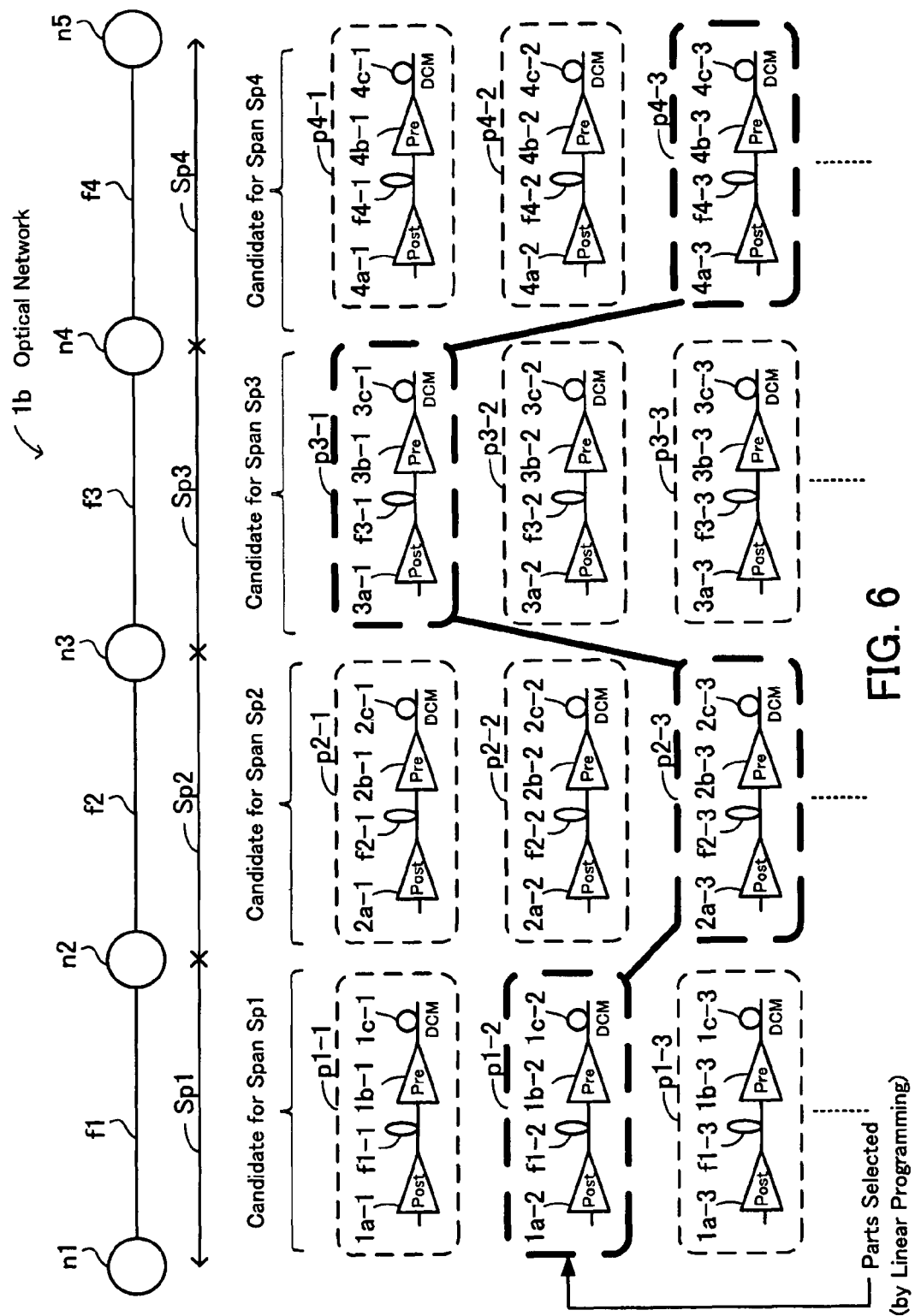

FIG. 6 schematically illustrates an example of selection of an optimum part from among a plurality of candidates for each span. The part selection unit 13 selects an optimum part from among a plurality of parts prepared for each span. In the example of FIG. 6, the part p1-2 is selected for the span Sp1, the part p2-3 is selected for the span Sp2, the part p3-1 is selected for the span Sp3, and the part p4-3 is selected for the span Sp4. The part selection unit 13 performs calculation in accordance with linear programming for selection of the optimum part for each span. (When one or more characteristics of the optical network constructed of the selected parts are sufficiently close to a limit of normal transmission, the selected parts are determined to be optimum. For example, the limit of the normal transmission is designated in advance by the network designer. Details of the calculation for selection of parts in accordance with linear programming are explained later.)

After a part is selected for each span, the construction control unit 14 constructs an optical network by combining the selected parts, and determines whether or not the constructed optical network realizes a condition near a desired condition. (The determination of the condition is made on the basis of the effective digits of the optical-transmission parameters.) In the case where change of one or more predetermined optical-transmission parameters can bring the condition realized by the constructed optical network closer to the desired condition, the construction control unit 14 extracts one of the selected parts, and changes the value of values of arbitrary one or more optical-transmission parameters by a small amount. Thereafter, the part selection unit 13 reselects parts (i.e., redetermines a combination of selects parts) by using linear programming. The redetermination is made because the change in one or more optical-transmission parameters in a part can affect one or more other parameters, so that the entire optical network can become unable to realize the desired characteristics. Therefore, when the value or values of one or more optical-transmission parameters are changed by a small amount, the operations for selection of parts and the following operations are repeated.

6. Quality Examination

Figure 7:
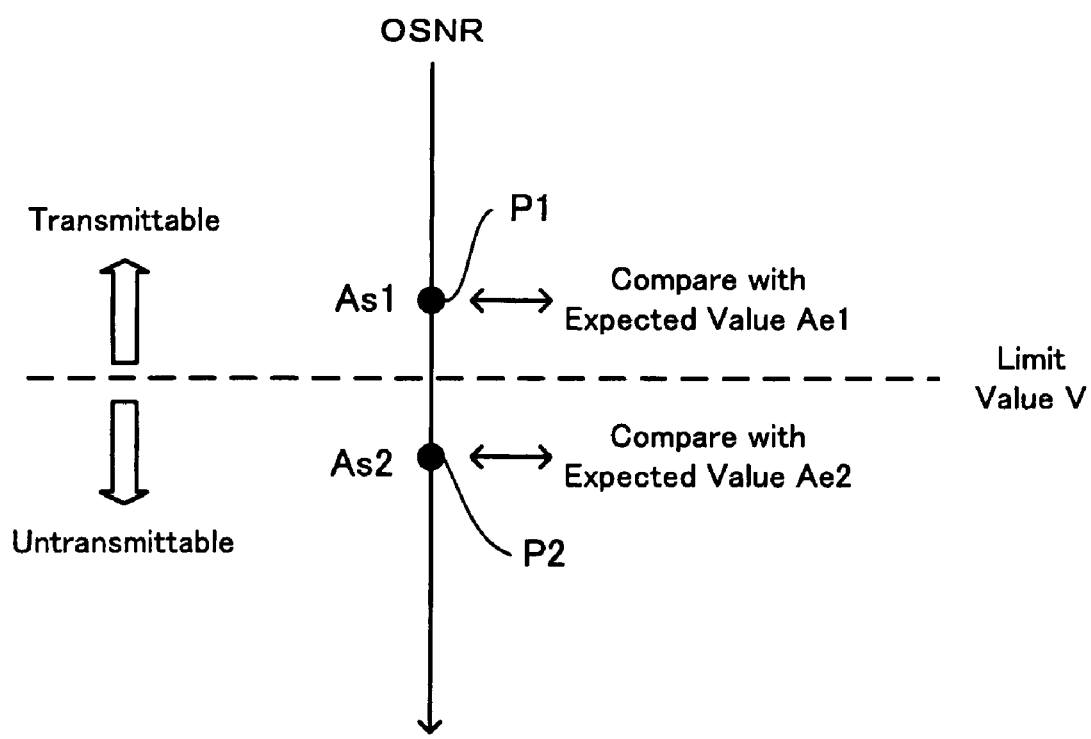
FIG. 7 illustrates values of a characteristic used in quality examination of the software of the optical-network design apparatus of FIG. 1.

An example of the quality examination is explained below. FIG. 7 illustrates values of a characteristic used in an example of quality examination of the software of the optical-network design apparatus 10. After the designing of the optical network is completed, the quality examination of the software (including at least one of the part generation unit 12, the part selection unit 13, and the construction control unit 14) of the optical-network design apparatus 10 is performed in order to confirm the reliability of the designed optical network.

When the quality examination of the software is performed, first, one of predetermined optical-transmission parameters in the designed optical network is chosen, and a value V of the limit of the transmission satisfying the desired condition is sought by moving (changing) the value of the chosen optical-transmission parameter.

Then, the value As1 of a specific characteristic (e.g., optical signal to noise ratio (OSNR)) of the optical network at a certain point P1 (hereinafter referred to as the first point P1) and an expected value Ae1 of the specific characteristic at the first point P1 are obtained, where the first point P1 is located in a first range of the specific characteristic on the normal-transmission side of the limit value V in which the transmission satisfying the desired condition is possible. (The value As1 of the specific characteristic at the first point P1 is hereinafter referred to as the first characteristic value As1.) The first characteristic value As1 (e.g., the OSNR at the first point P1) in the designed optical network is calculated by the quality examination unit 15. On the other hand, the expected value Ae1 of the specific characteristic at the first point P1 is obtained independently of the optical-network design apparatus 10, for example, by manual calculation. Thereafter, the quality examination unit 15 compares the first characteristic value As1 and the expected value Ae1.

In addition, the value As2 of a specific characteristic (e.g., optical signal to noise ratio (OSNR)) of the optical network at a certain point P2 (hereinafter referred to as the second point P2) and an expected value Ae2 of the specific characteristic at the second point P2 are obtained, where the second point P2 is located in a second range of the specific characteristic on the opposite side of the limit value V in which the transmission satisfying the desired condition is impossible. The second characteristic value As2 (e.g., the OSNR at the second point P2) in the designed optical network is calculated by the quality examination unit 15. On the other hand, the expected value Ae2 of the specific characteristic at the second point P2 is obtained independently of the optical-network design apparatus 10, for example, by manual calculation. Thereafter, the quality examination unit 15 compares the second characteristic value As2 and the expected value Ae2.

When the characteristic value calculated by the quality examination unit 15 is identical to the expected value obtained independently of the optical-network design apparatus 10 at both of the first and second points (i.e., when As1=Ae1 and As2=Ae2), it is possible to determine that the result of the examination performed by the optical-network design apparatus 10 is satisfactory, the quality of the software of the optical-network design apparatus 10 is satisfactory, and the reliability of the optical network designed by the software is high. When the characteristic value calculated by the quality examination unit 15 is different from the expected value obtained independently of the optical-network design apparatus 10 at either of the first and second points (i.e., when As1≠Ae1 or As2≠Ae2), it is possible to determine that the quality of the software of the optical-network design apparatus 10 is unsatisfactory, and the reliability of the optical network designed by the software is low. The result of the examination (satisfactory or unsatisfactory) is displayed on the optical-network design apparatus 10 in a manner appropriate for the network designer.

As explained above, the optical-network design apparatus 10 can perform quality examination of the software in order to determine the reliability of the optical network automatically designed by use of the optical-network design apparatus 10. Therefore, the network designer can confirm the reliability of the optical network automatically designed by use of the optical-network design apparatus 10, so that the reliability and quality of the designed optical network can be improved.

7. Concrete Example 7.1 Example of Modeling

Hereinbelow, an example of modeling which is used when the parts are selected by use of linear programming is explained. According to the linear programming, in order to seek a point closest to a target point, an objective function is created, and a minimum or a maximum of the objective function is obtained. In this example, a minimum of the objective function is obtained, and the objective function is expressed by the formula, $$z = \min(\text{negError} + \text{posError}), \quad (1)$$

where negError and posError are variables respectively indicating tolerances on the negative and positive sides of the target point, and are positive or zero.

Let a value Q be an index of a transmission characteristic of the optical network for use in quality evaluation of optical transmission, and is specifically a value quantitatively indicating an influence of noise on the amplitude and being called a noise index value. (A greater Q value is deemed to indicate better transmission quality.) The conditions on the total Q value of a path labelled "demand k" in a vicinity of the target value Qth of the total Q value are indicated by the following conditional inequalities (2a) and (2b).

$$\sum_{span \in \text{Demand } k} Q + \text{negError} \geq Qth_{\text{demand } k} \quad (2a)$$

$$\sum_{span \in \text{Demand } k} Q - \text{posError} \leq Qth_{\text{demand } k} \quad (2b)$$

In this specification, demands are paths each constituted by one or more spans in the optical network. The width of the vicinity of the target value Qth for the path labelled "demand k" is determined by the conditional inequalities (2a) and (2b).

Figure 8:
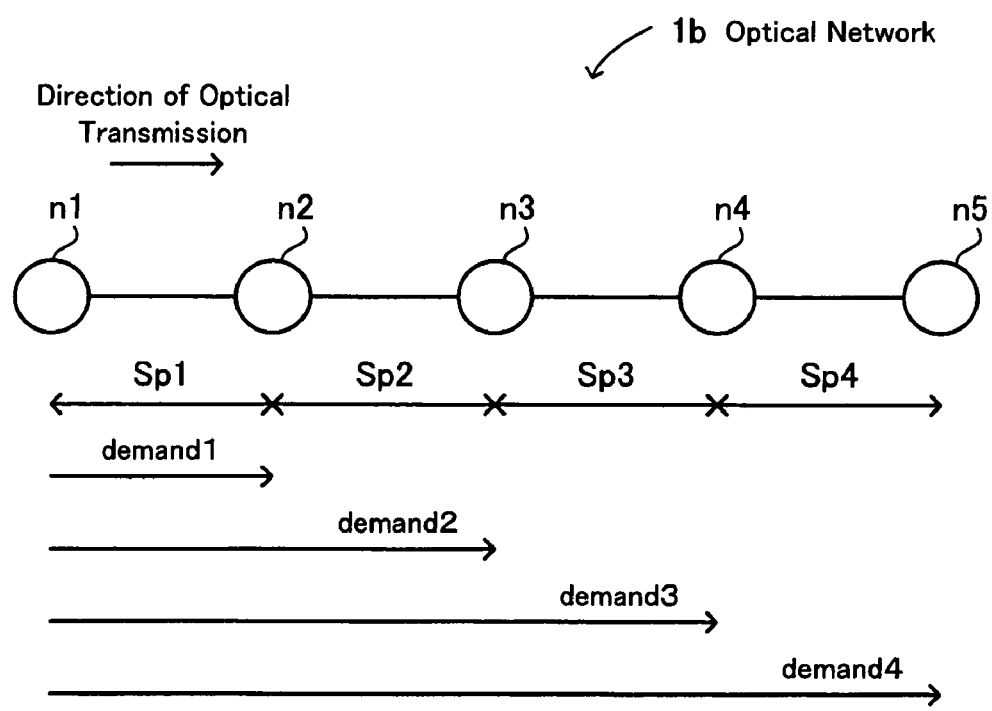
FIG. 8 illustrates examples of demands.

FIG. 8 illustrates examples of demands. In FIG. 8, the demand 1 is a path over the span Sp1, the demand 2 is a path over the spans Sp1 and Sp2, the demand 3 is a path over the spans Sp1, Sp2, and Sp3, and the demand 4 is a path over the spans Sp1, Sp2, Sp3, and Sp4. A combination of parts for the spans Sp1, Sp2, Sp3, and Sp4 which realizes a total Q value in the vicinity of the target value Qth can be extracted for the demand k by selecting one or more parts for the demand k so as to minimize the sum of the variables negError and posError satisfying the conditional inequalities (2a) and (2b).

Figure 9:
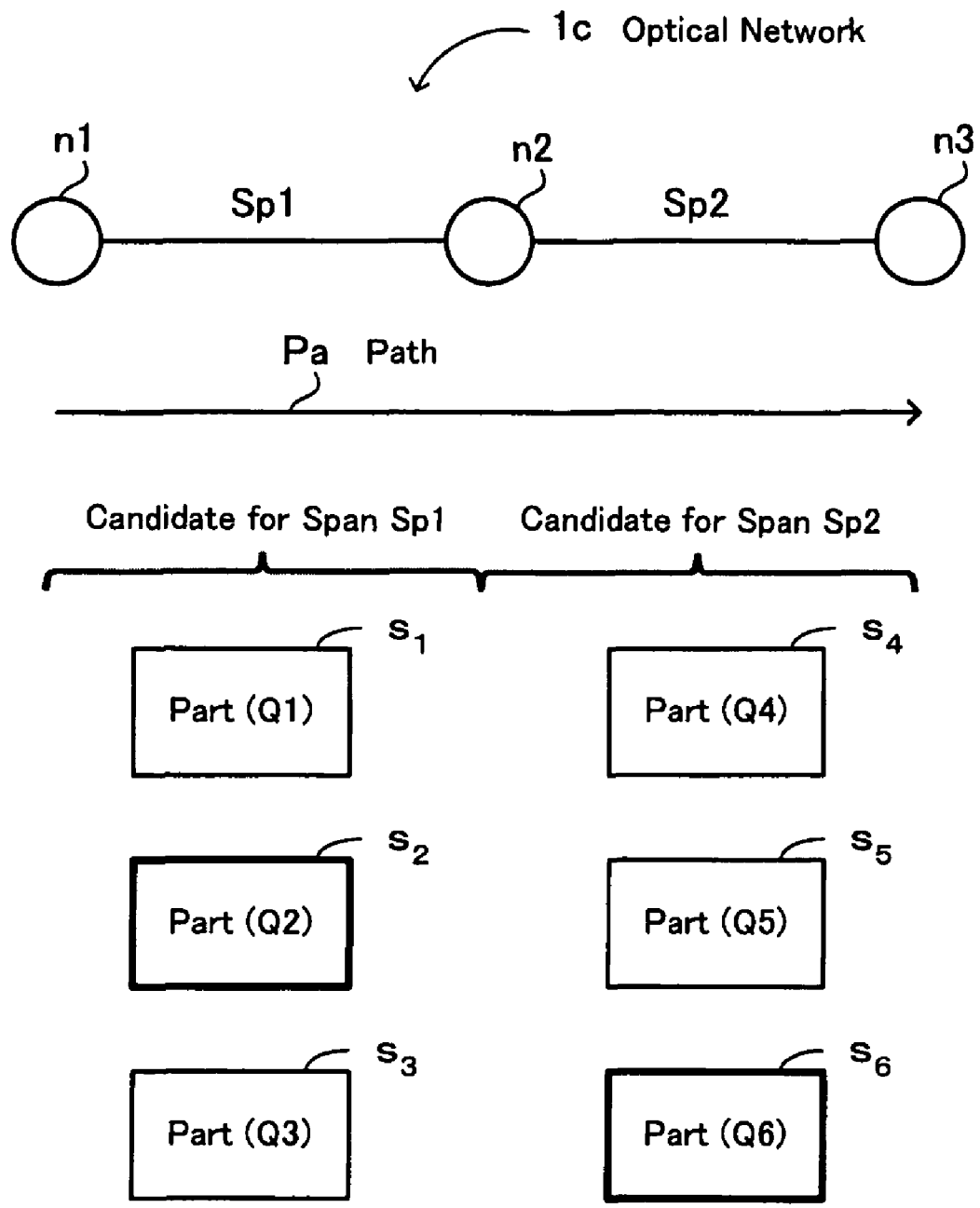
FIG. 9 illustrates an example of selection of parts which realize a total Q value in the vicinity of the target value Qth.

FIG. 9 illustrates an example of selection of parts which realize a total Q value in the vicinity of the target value Qth. The optical network is illustrated in FIG. 9 includes the nodes n1, n2, and n3, the span Sp1 between the nodes n1 and n2, and the span Sp2 between the nodes n2 and n3. Parts $s_1$ to $s_3$ are prepared as candidate parts for the span Sp1, and parts $s_4$ to $s_6$ are prepared as candidate parts for the span Sp2. In FIG. 9, the Q values realized by the parts $s_1$ to $s_3$ are respectively denoted by $Q_1$ to $Q_3$, and the Q values realized by the parts $s_4$ to $s_6$ are respectively denoted by $Q_4$ to $Q_6$.

Consider a design in which parts are selected so that the sum Qtotal of the Q values (total Q value) in the path Pa becomes as close as possible to the target value Qth.

The following conditional inequalities (2a-1) and (2b-1) are derived from the conditional inequalities (2a) and (2b).

$$Q_1 \cdot S_1 + Q_2 \cdot S_2 + Q_3 \cdot S_3 + Q_4 \cdot S_4 + Q_5 \cdot S_5 + Q_6 \cdot S_6 + \text{negError} \geq Q\text{th} \quad (2a\text{-}1)$$

$$Q_1 \cdot S_1 + Q_2 \cdot S_2 + Q_3 \cdot S_3 + Q_4 \cdot S_4 + Q_5 \cdot S_5 + Q_6 \cdot S_6 - \text{posError} \leq Q\text{th} \quad (2b\text{-}1)$$

In the above conditional inequalities (2a) and (2b), $S_1$, $S_2$, $S_3$, $S_4$, $S_5$, and $S_6$ each indicate a state of selection of a corresponding one of the plurality of candidate parts for the spans Sp1 and Sp2, and each of the values $S_1$, $S_2$, $S_3$, $S_4$, $S_5$, and $S_6$ is one when the candidate part corresponding to the value is selected for the corresponding span, and zero when the candidate part corresponding to the value is not selected for the corresponding span. Then, a set of the values $S_1$ to $S_6$ satisfying the conditional inequalities (2a-1) and (2b-1) and minimizing the sum of the variables negError and posError is obtained. For example, when $(S_1, S_2, S_3, S_4, S_5, S_6)=(0, 1, 0, 0, 0, 1)$ is obtained as a solution of the conditional inequalities (2a-1) and (2b-1) under other constraints, the part $s_2$ is selected for the span Sp1, and the part $s_6$ is selected for the span Sp2. That is, in this case, an optical network in which optical transmission through the path Pa having the Qtotal value close to the target value Qth is possible (i.e., an optical network having a transmission characteristic near the limit of normal transmission) can be constructed by using the parts $s_2$ and $s_6$ in the spans Sp1 and Sp2.

Figure 10:
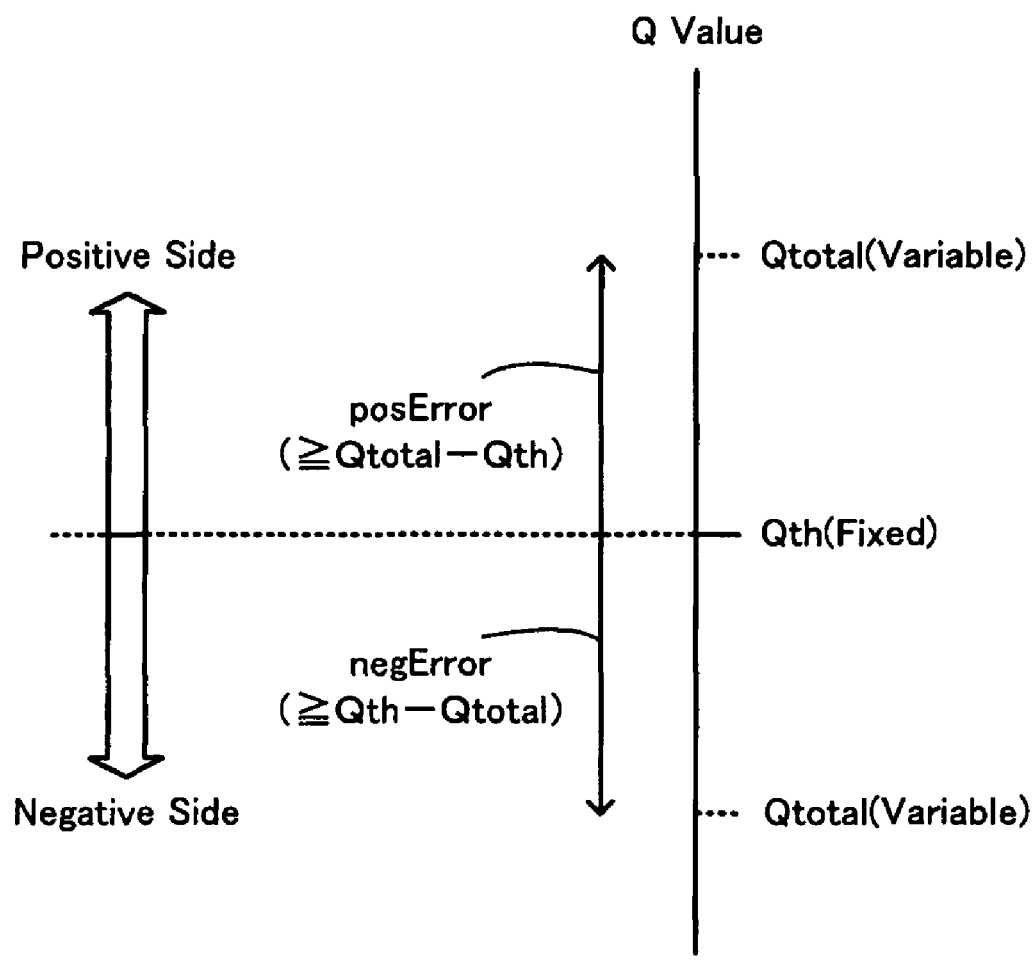
FIG. 10 illustrates an objective function and conditional inequalities.

FIG. 10 illustrates the objective function and the conditional inequalities (2a) and (2b). In the case where the variable Qtotal is smaller than the fixed target value Qth, the variable negError (which indicates the tolerance of the value Qtotal on the negative side of the target value Qth) should be equal to or greater than the difference Qth−Qtotal as indicated in the conditional inequality (2a). At this time, the conditional inequality (2b) exists regardless of the variable posError since the variable posError is positive or zero. Therefore, the sum of the variables negError and posError is minimized when negError=Qth−Qtotal and posError=0. That is, the minimum of the variable negError is equal to the difference Qth−Qtotal.

On the other hand, in the case where the variable Qtotal is greater than the fixed target value Qth, the variable posError (which indicates the tolerance of the value Qtotal on the positive side of the target value Qth) should be equal to or greater than the difference Qtotal−Qth as indicated in the conditional inequality (2b). At this time, the conditional inequality (2a) exists regardless of the variable negError since the variable negError is positive or zero. Therefore, the sum of the variables posError and negError is minimized when posError=Qtotal−Qth and negError32 0. That is, the minimum of the variable posError is equal to the difference Qtotal−Qth.

As explained above, to minimize the sum of the variables negError and posError is to obtain the minimum width of the tolerable range of the total Q value in the vicinity of the target value Qth.

7.2 Other Constraints

Next, other constraints which are to be considered when the minimum of the objective function is obtained are explained below. In the following explanations, it is assumed that the dispersion value, the Q value, the PMD (polarization mode dispersion) value, the PBN (passband narrowing) value, and the XT (cross talk) value are used as the optical-transmission parameters. The constraints include a dispersion constraint, a Q-value constraint, a transmission-penalty constraint, a span constraint, and the like.

The dispersion constraints imposed on each demand are indicated by the following conditional inequalities (3a) and (3b).

$$\sum_{span \in Demand} D_{Span\ Upper} \leq \text{Upper Tolerance}(d) \quad (3a)$$

$$\sum_{span \in Demand} D_{Span\ Lower} \geq \text{Lower Tolerance}(d) \quad (3b)$$

The conditional inequality (3a) indicates that the sum of one or more upper-limit values of dispersion in one or more spans (denoted by "$D_{Span\ Upper}$") in each demand should not exceed the upper tolerance of the dispersion (denoted by "Upper Tolerance (d)"). That is, the conditional inequality (3a) indicates that one or more parts should be selected for the one or more spans so that the sum of one or more upper-limit values of dispersion in the one or more spans in each demand does not exceed the upper tolerance of the dispersion. In addition, the conditional inequality (3b) indicates that the sum of one or more lower-limit values of dispersion in the one or more spans (denoted by "$D_{Span\ Lower}$") in each demand should not fall below the lower tolerance of the dispersion (denoted by "Lower Tolerance (d)"). That is, the conditional inequality (3b) indicates that one or more parts should be selected for the one or more spans so that the sum of one or more lower-limit values of dispersion in the one or more spans in each demand does not fall below the lower tolerance of the dispersion.

The Q-value constraint imposed on each demand is indicated by the following conditional inequality (4).

$$\sum_{span \in Demand} Q_{span} \leq Qth(d) \quad (4)$$

The conditional inequality (4) indicates that the sum of one or more Q values in one or more spans (denoted by "$Q_{Span}$") in each demand should not exceed the upper tolerance of the total Q value (denoted by "Qth(d)"). That is, the conditional inequality (4) indicates that one or more parts should be selected for the one or more spans so that the sum of one or more Q values in the one or more spans in each demand does not exceed the upper tolerance of the total Q value.

The transmission-penalty constraints imposed on each demand are indicated by the following conditional inequalities (5a), (5b), and (5c). The transmission-penalty constraints limit transmission-penalty values.

$$\sum_{span \in Demand} PMD_{span} \leq PMD_{Lowth} \quad (5a)$$

$$\sum_{span \in Demand} PBN_{span} \leq PBN_{Lowth} \quad (5b)$$

-continued $$\sum_{span \in Demand} XT_{span} \leq XT_{Lowth} \qquad (5c)$$

The conditional inequality (5a) for PMD indicates that the sum of one or more PMD values in one or more spans (denoted by "$PMD_{Span}$") in each demand should not exceed the lower limit of the PMD values (denoted by "$PMD_{Lowth}$"). That is, the conditional inequality (5a) indicates that one or more parts should be selected for the one or more spans so that the sum of one or more PMD values in the one or more spans in each demand does not exceed the lower limit of the PMD values. The conditional inequality (5b) for PBN indicates that the sum of one or more PBN values in one or more spans (denoted by "$PBN_{Span}$") in each demand should not exceed the lower limit of the PBN values (denoted by "$PBN_{Lowth}$"). That is, the conditional inequality (5b) indicates that one or more parts should be selected for the one or more spans so that the sum of one or more PBN values in the one or more spans in each demand does not exceed the lower limit of the PBN values. The conditional inequality (5c) for XT indicates that the sum of one or more XT values in one or more spans (denoted by "$XT_{Span}$") in each demand should not exceed the lower limit of the XT values (denoted by "$XT_{Lowth}$"). That is, the conditional inequality (5c) indicates that one or more parts should be selected for the one or more spans so that the sum of one or more XT values in the one or more spans in each demand does not exceed the lower limit of the XT values.

Alternatively, it is possible to impose the transmission-penalty constraints indicated by the following conditional equations (6a), (6b), and (6c), instead of the conditional inequalities (5a), (5b), and (5c). That is, it is possible to use the transmission-penalty constraints which limit to a predetermined value the sum of one or more transmission-penalty values (the PMD, PBN, or XT values) in one or more spans in each demand.

$$\sum_{span \in Demand} PMD_{span} = PMD_C \qquad (6a)$$

$$\sum_{span \in Demand} PBN_{span} = PBN_C \qquad (6b)$$

$$\sum_{span \in Demand} XT_{span} = XT_C \qquad (6c)$$

The conditional equation (6a) for PMD indicates that the sum of one or more PMD values in the one or more spans in each demand should be equal to a certain PMD value (denoted by "PMDc"). The conditional equation (6b) for PBN indicates that the sum of one or more PBN values in the one or more spans in each demand should be equal to a certain PBN value (denoted by "PBNc"). The conditional equation (6c) for XT indicates that the sum of one or more XT values in the one or more spans in each demand should be equal to a certain XT value (denoted by "XTc").

Figure 11:
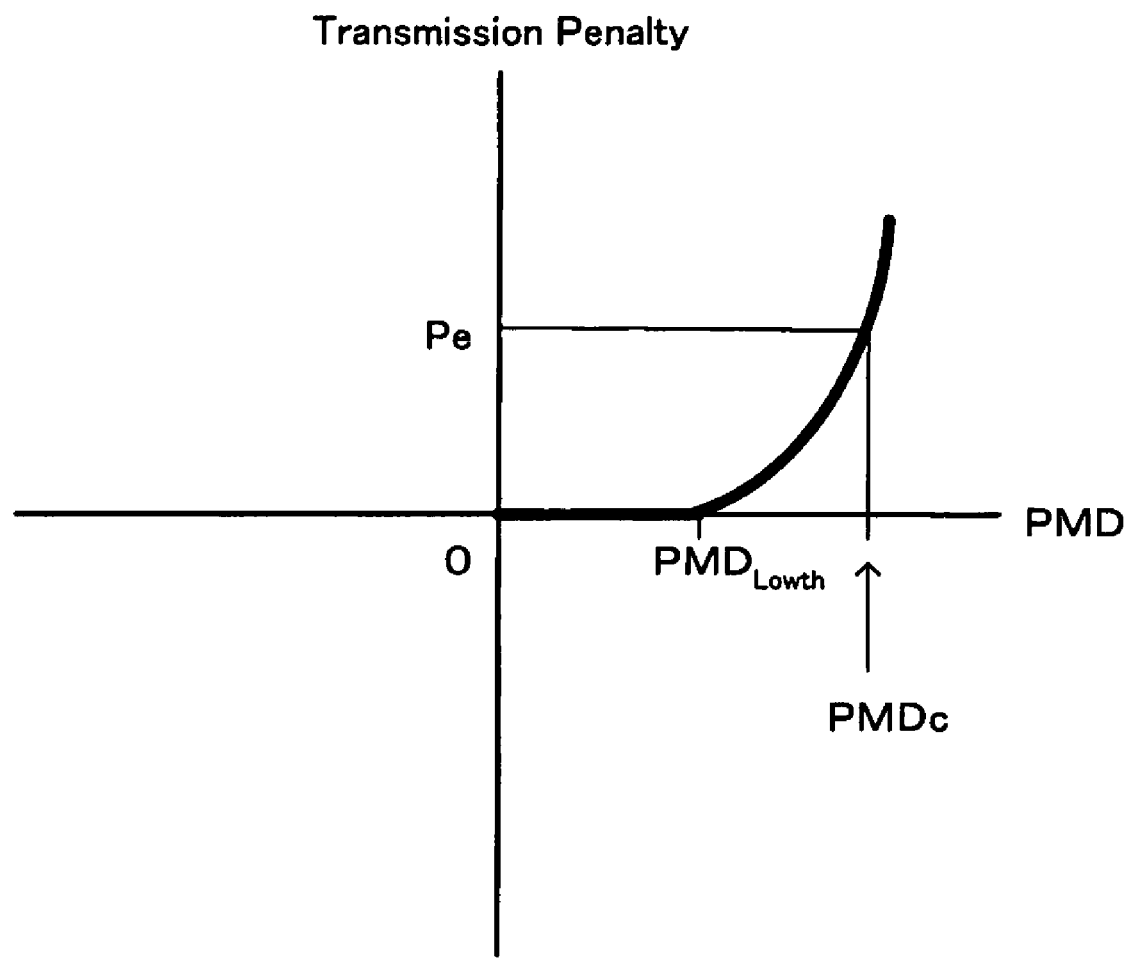
FIG. 11 illustrates a limit of transmission penalty.

The transmission penalty is explained below with reference to FIG. 11, which illustrates a limit of the transmission penalty (ordinate) in relation to PMD (abscissa) as an example of a factor which affects the transmission penalty. When the PMD value is decreased, the transmission penalty becomes zero at a certain PMD value, which is the aforementioned lower limit $PMD_{Lowth}$. In the range of the PMD value above the lower limit $PMD_{Lowth}$, the transmission penalty nonlinearly varies with the PMD value. Therefore, when the transmission penalty caused by PMD is desired to be suppressed to zero, the constraint indicated by the conditional inequality (5a) is imposed on the sum of one or more PMD values in one or more spans in each demand. On the other hand, when the transmission penalty caused by PMD is desired to be constrained to be equal to a predetermined value Pe, the constraint indicated by the conditional inequality (6a) is imposed on the sum of one or more PMD values in the one or more spans in each demand. The transmission penalty caused by PBN or XT can also be constrained in a similar manner.

Further, a span (constraint) condition that only one part be arranged in each span is indicated by the following equation (7).

$$\sum_{element \in SpanN} x_{element} = 1 (x_{element} = 0 \text{ or } 1) \qquad (7)$$

In the equation (7), the parameters $x_{element}$ indicate selection or nonselection of each candidate part (element) prepared for each span. When a part corresponding to $x_{element}$ is a candidate part selected for the span, $x_{element}=1$. When a part corresponding to $x_{element}$ is not a candidate part selected for the span, $x_{element}=0$. Since the equation (7) indicates that the sum of the parameters $x_{element}$ corresponding to all the candidate parts prepared for each span equals to one, the equation (7) means that only one part can be selected for and used in each span.

7.3 Matrix Representation

The above conditional inequalities and equations can be represented in a matrix form as indicated in FIG. 12. When the matrix having as matrix elements the terms in the left sides of the conditional inequalities and equations are denoted by A, and the column vector having as vector elements the identification parameters $S_1$ to $S_N$ identifying the candidate parts and the variables negError and posError is denoted by v1, and the column vector having as vector elements the terms in the right sides of the conditional inequalities and equations is denoted by v2, the matrix representation of FIG. 12 can be simply represented as A×v1=v2. The matrix representation of FIG. 12 is explained in detail below. In the following explanations, the values of PMD, XT, Q, and the like are antilogarithmic (linear) values, and are not logarithmic (dB) values.

In the matrix representation of FIG. 12, the row r1 indicates the formula (1). That is, the inner product of the row vector (0, 0, . . . , 0, 1, 1) and the column vector ($S_1, S_2, \ldots, S_N$, negError, posError) leads to the objective function (negError+posError) on the right side of the equation (1).

The rows r2 indicate the formula (3a). Specifically, the uppermost one of the rows r2 indicates the constraint imposed on the upper-limit value of dispersion in the demand 1, where $D_{Upper\ 1\ d1}, D_{Upper\ 2\ d1}, \ldots,$ and $D_{Upper\ N\ d1}$ denote the upper-limit values of dispersion in the candidate parts $s_1, s_2, \ldots, s_N$ for one or more spans in the demand 1, and Upper Tollerance (d1) denotes the upper tolerance of the dispersion in the demand 1. Since the inner product of the row vector ($D_{Upper\ 1\ d1}, D_{Upper\ 2\ d1}, \ldots, D_{Upper\ N d1}, 0, 0$) and the column vector ($S_1, S_2, \ldots, S_N$, negError, posError) is the sum of one or more upper-limit values of dispersion in one or more spans in the demand 1, the uppermost one of the rows r2 indicates that the sum of one or more upper-limit values of dispersion of one or more of the candidate parts $s_1, s_2, \ldots, s_N$, selected for the one or more spans in the demand 1 should not exceed the upper tolerance "Upper Tollerance (d1)" of the dispersion in the demand 1. In addition, the lowermost one of the rows r2 indicates the constraint imposed on the upper-limit value of dispersion in the demand N, where $D_{Upper\ 1\ dN}$, $D_{Upper\ 2\ dN}, \ldots,$ and $D_{Upper\ N\ dN}$ denote the upper-limit values of dispersion in the candidate parts $s_1, s_2, \ldots, s_N$ for one or more spans in the demand N, and Upper Tollerance (dN) denotes the upper tolerance of the dispersion in the demand N. Since the inner product of the row vector $(D_{Upper\ 1\ dN}, D_{Upper\ 2\ dN}, \ldots, D_{Upper\ N\ dN}, 0, 0)$ and the column vector $(S_1, S_2, \ldots, S_N,$ negError, posError) is the sum of one or more upper-limit values of dispersion in the one or more spans in the demand N, the lowermost one of the rows r2 indicates that the sum of one or more upper-limit values of dispersion of one or more of the candidate parts $s_1, s_2, \ldots, s_N$, selected for the one or more spans in the demand N should not exceed the upper tolerance "Upper Tollerance (dN)" of the dispersion in the demand N.

The rows r3 indicate the formula (3b). Specifically, the uppermost one of the rows r3 indicates the constraint imposed on the lower-limit value of dispersion in the demand 1, where $D_{Lower\ 1\ d1}, D_{Lower\ 2\ d1}, \ldots,$ and $D_{Lower\ N\ d1}$ denote the lower-limit values of dispersion in the candidate parts $s_1, s_2, \ldots, s_N$ for one or more spans in the demand 1, and Lower Tollerance (d1) denotes the lower tolerance of the dispersion in the demand 1. Since the inner product of the row vector $(D_{Lower\ 1\ d1}, D_{Lower\ 2\ d1}, \ldots, D_{Lower\ N\ d1}, 0, 0)$ and the column vector $(S_1, S_2, \ldots, S_N,$ negError, posError) is the sum of one or more lower-limit values of dispersion in the one or more spans in the demand 1, the uppermost one of the rows r3 indicates that the sum of one or more lower-limit values of dispersion of one or more of the candidate parts $s_1, s_2, \ldots, s_N$, selected for the one or more spans in the demand 1 should not fall below the lower tolerance "Lower Tollerance (d1)" of the dispersion in the demand 1. In addition, the lowermost one of the rows r3 indicates the constraint imposed on the lower-limit value of dispersion in the demand N, where $D_{Lower\ 1\ dN}$, $D_{Lower\ 2\ dN}, \ldots,$ and $D_{Lower\ N\ dN}$ denote the lower-limit values of dispersion in the candidate parts $s_1, s_2, \ldots, s_N$ for one or more spans in the demand N, and Lower Tollerance (dN) denotes the lower tolerance of the dispersion in the demand N. Since the inner product of the row vector $(D_{Lower\ 1\ dN}, D_{Lower\ 2\ dN}, \ldots, D_{Lower\ N\ dN}, 0, 0)$ and the column vector $(S_1, S_2, \ldots, S_N,$ negError, posError) is the sum of one or more lower-limit values of dispersion in the one or more spans in the demand N, the lowermost one of the rows r3 indicates that the sum of one or more lower-limit values of dispersion of one or more of the candidate parts $s_1, s_2, \ldots, s_N$, selected for the one or more spans in the demand N should not fall below the lower tolerance "Lower Tollerance (dN)" of the dispersion in the demand N.

The rows r4 indicate the formula (4). Specifically, the uppermost one of the rows r4 indicates the constraint imposed on the Q value in the demand 1, where $Q_{1\ d1}, Q_{2\ d1}, \ldots,$ and $Q_{N\ d1}$ denote the Q values of the candidate parts $s_1, s_2, \ldots, s_N$ for one or more spans in the demand 1, and Qth(d1) denotes the target value of the Qtotal value in the demand 1. Since the inner product of the row vector $(Q_{1\ d1}, Q_{2\ d1}, \ldots, Q_{N\ d1}, 0, 0)$ and the column vector $(S_1, S_2, \ldots, S_N,$ negError, posError) is the sum of one or more Q values in the one or more spans in the demand 1, the uppermost one of the rows r4 indicates that the sum of one or more Q values of one or more of the candidate parts $s_1, s_2, \ldots, s_N$, selected for the one or more spans in the demand 1 should not exceed the target value "Qth(d1)" of the Q value in the demand 1. In addition, the lowermost one of the rows r4 indicates the constraint imposed on the Q value in the demand N, where $Q_{1\ dN}, Q_{2\ dN}, \ldots,$ and $Q_{N\ dN}$ denote the Q values of the candidate parts $s_1, s_2, \ldots, s_N$ for one or more spans in the demand N, and Qth(dN) denotes the target value of the Qtotal value in the demand N. Since the inner product of the row vector $(Q_{1\ dN}, Q_{2\ dN}, \ldots, Q_{N\ dN}, 0, 0)$ and the column vector $(S_1, S_2, \ldots, S_N,$ negError, posError) is the sum of one or more Q values in the one or more spans in the demand N, the lowermost one of the rows r4 indicates that the sum of one or more Q values of one or more of the candidate parts $s_1, s_2, \ldots, s_N$, selected for the one or more spans in the demand N should not exceed the target value "Qth(dN)" of the Q value in the demand N.

The rows r5 indicate the formula (5a). Specifically, the uppermost one of the rows r5 indicates the constraint imposed on the PMD value in the demand 1, where $PMD_{1\ d1}$, $PMD_{2\ d1}, \ldots,$ and $PMD_{N\ d1}$ denote the PMD values of the candidate parts $s_1, s_2, \ldots, s_N$ for one or more spans in the demand 1, and $PMD_{Lowth}(d1)$ denotes the lower limit of the PMD value in the demand 1. Since the inner product of the row vector $(PMD_{1\ d1}, PMD_{2\ d1}, \ldots, PMD_{N\ d1}, 0, 0)$ and the column vector $(S_1, S_2, \ldots, S_N,$ negError, posError) is the sum of one or more PMD values in the one or more spans in the demand 1, the uppermost one of the rows r5 indicates that the sum of one or more PMD values of one or more of the candidate parts $s_1, s_2, \ldots, s_N$, selected for the one or more spans in the demand 1 should not exceed the lower-limit value "$PMD_{Lowth}(d1)$" of the PMD value in the demand 1. In addition, the lowermost one of the rows r5 indicates the constraint imposed on the PMD value in the demand N, where $PMD_{1\ dN}$, $PMD_{2\ dN}, \ldots,$ and $PMD_{N\ dN}$ denote the PMD values of the candidate parts $s_1, s_2, \ldots, s_N$ for one or more spans in the demand N, and $PMD_{Lowth}(dN)$ denotes the lower limit of the PMD value in the demand N. Since the inner product of the row vector $(PMD_{1\ dN}, PMD_{2\ dN}, \ldots, PMD_{N\ dN}, 0, 0)$ and the column vector $(S_1, S_2, \ldots, S_N,$ negError, posError) is the sum of one or more PMD values in the one or more spans in the demand N, the lowermost one of the rows r5 indicates that the sum of one or more PMD values of one or more of the candidate parts $s_1, s_2, \ldots, s_N$, selected for the one or more spans in the demand N should not exceed the lower-limit value "$PMD_{Lowth}(dN)$" of the PMD value in the demand N.

The rows r6 indicate the formula (5c). (In this example, the PBN parameter is not used.) Specifically, the uppermost one of the rows r6 indicates the constraint imposed on the XT value in the demand 1, where $XT_{1\ d1}, XT_{2\ d1}, \ldots,$ and $XT_{N\ d1}$ denote the XT values of the candidate parts $s_1, s_2, \ldots, s_N$ for one or more spans in the demand 1, and $XT_{Lowth}(d1)$ denotes the lower limit of the XT value in the demand 1. Since the inner product of the row vector $(XT_{1\ d1}, XT_{2\ d1}, \ldots, XT_{N\ d1}, 0, 0)$ and the column vector $(S_1, S_2, \ldots, S_N,$ negError, posError) is the sum of one or more XT values in the one or more spans in the demand 1, the uppermost one of the rows r6 indicates that the sum of one or more XT values of one or more of the candidate parts $s_1, s_2, \ldots, s_N$, selected for the one or more spans in the demand 1 should not exceed the lower-limit value "$XT_{Lowth}(d1)$" of the XT value in the demand 1. In addition, the lowermost one of the rows r6 indicates the constraint imposed on the XT value in the demand N, where $XT_{1\ dN}, XT_{2\ dN}, \ldots,$ and $XT_{N\ dN}$ denote the XT values of the candidate parts $s_1, s_2, \ldots, S_N$ for one or more spans in the demand N, and $XT_{Lowth}(dN)$ denotes the lower limit of the XT value in the demand N. Since the inner product of the row vector $(XT_{1\ dN}, XT_{2\ dN}, \ldots, XT_{N\ dN}, 0, 0)$ and the column vector $(S_1, S_2, \ldots, S_N,$ negError, posError) is the sum of one or more XT values in the one or more spans in the demand N, the lowermost one of the rows r6 indicates that the sum of one or more XT values of one or more of the candidate parts $s_1, s_2, \ldots, s_N$, selected for the one or more spans in the demand N should not exceed the lower-limit value "$XT_{Lowth}(dN)$" of the XT value in the demand N.

The rows r7 indicate the formula (7). Specifically, the uppermost one of the rows r7 indicates the span (constraint) condition imposed on the span Sp1, where $x_{Span\ 1\ 1}$, $x_{Span\ 1\ 2}, \ldots,$ and $x_{Span\ 1\ N}$ denote parameters each indicating whether or not a candidate part corresponding to the parameter is prepared for the span Sp1. (When a part corresponding to each of the parameters $x_{Span\ 1\ 1}, x_{Span\ 1\ 2}, \ldots,$ and $x_{Span\ 1\ N}$ is a candidate part prepared for the span Sp1, the parameter is equal to one. When a part corresponding to each of the parameters $x_{Span\ 1\ 1}, x_{Span\ 1\ 2}, \ldots,$ and $x_{Span\ 1\ N}$ is not a candidate part prepared for the span Sp1, the parameter is equal to zero.) Since the inner product of the row vector $(x_{Span\ 1\ 1}, x_{Span\ 1\ 2}, \ldots, x_{Span\ 1\ N}, 0, 0)$ and the column vector $(S_1, S_2, \ldots, S_N,$ negError, posError) is equal to one, the uppermost one of the rows r7 indicates that only one part is selected for and used in the span Sp1. In addition, the lowermost one of the rows r7 indicates the span (constraint) condition imposed on the span SpN, where $x_{Span\ N\ 1}$, $x_{Span\ N\ 2}, \ldots,$ and $x_{Span\ N\ N}$ denote parameters each indicating whether or not a candidate part corresponding to the parameter is prepared for the span SpN. (When a part corresponding to each of the parameters $x_{Span\ N\ 1}, x_{Span\ N\ 2}, \ldots,$ and $x_{Span\ N\ N}$ is a candidate part prepared for the span SpN, the parameter is equal to one. When a part corresponding to each of the parameters $x_{Span\ N\ 1}, x_{Span\ N\ 2}, \ldots,$ and $x_{Span\ N\ N}$ is not a candidate part prepared for the span SpN, the parameter is equal to zero.) Since the inner product of the row vector $(x_{Span\ N\ 1}, x_{Span\ N\ 2}, \ldots, x_{Span\ N\ N}, 0, 0)$ and the column vector $(S_1, S_2, \ldots, S_N,$ negError, posError) is equal to one, the lowermost one of the rows r7 indicates that only one part is selected for and used in the span SpN.

The row r8-1 corresponds to the formula (2a). The row r8-1 indicates that the inner product of the row vector $(Q_{1\ dN}, Q_{2\ dN}, \ldots, Q_{N\ d1}, 1, 0)$ and the column vector $(S_1, S_2, \ldots, S_N,$ negError, posError) should not fall below the target value "$Qth(dN)$" of the total Q value in the demand N. In addition, the row r8-2 corresponds to the formula (2b). The row r8-2 indicates that the inner product of the row vector $(Q_{1\ dN}, Q_{2\ dN}, \ldots, Q_{N\ d1}, 0, -1)$ and the column vector $(S_1, S_2, \ldots, S_N,$ negError, posError) should not exceed the target value "$Qth(dN)$" of the total Q value in the demand N.

7.4 Example of Calculation

An example of concrete calculation is explained below. FIG. 13 indicates an optical network constituted by two spans, and values of optical-transmission parameters of candidate parts. The optical network 1c illustrated in FIG. 13 includes the nodes n1, n2, and n3, the span Sp1 between the nodes n1 and n2, and the span Sp2 between the nodes n2 and n3. The demand 1 is a path from the node n1 to the n2, and the demand 2 is a path from the node n1 to the node n3 through the node n2.

The candidate parts for the span Sp1 include the parts #1 to #5, and the candidate parts for the span Sp2 include the parts #6 to #10. The optical-transmission parameters of each part include PMD (polarization mode dispersion), XT (cross talk), Q (Q value), $D_{Upper}$ (upper-limit of dispersion), and $D_{Lower}$ (lower-limit of dispersion).

The values of the optical-transmission parameters for the span Sp1 are: PMD=8, XT=1, Q=25, $D_{Upper}$=45, and $D_{Lower}$=0 in the part #1; PMD=6, XT=2, Q=23, $D_{Upper}$=50, and $D_{Lower}$=5 in the part #2; PMD=4, XT=3, Q=18, $D_{Upper}$=40, and $D_{Lower}$=0 in the part #3; PMD=2, XT=4, Q=20, $D_{Upper}$=40, and $D_{Lower}$=10 in the part #4; and PMD=1, XT=5, Q=22, $D_{Upper}$=50, and $D_{Lower}$=0 in the part #5. The values of the optical-transmission parameters for the span Sp2 are: PMD=8, XT=1, Q=25, $D_{Upper}$=15, and $D_{Lower}$=5 in the part #6; PMD=6, XT=2, Q=23, $D_{Upper}$=18, and $D_{Lower}$=−3 in the part #7; PMD=4, XT=3, Q=18, $D_{Upper}$=15, and $D_{Lower}$=5 in the part #8; PMD=2, XT=4, Q=20, $D_{Upper}$=20, and $D_{Lower}$=2 in the part #9; and PMD=1, XT=5, Q=22, $D_{Upper}$=25, and $D_{Lower}$=5 in the part #10.

In addition, the constraints are set as indicated by the conditional inequalities (8a) to (8g).

$$PMD \leq 10 \tag{8a}$$

$$XT \leq 8 \tag{8b}$$

$$Q \leq 40 \tag{8c}$$

$$D_{Upper\ d1} \leq 1000 \tag{8d}$$

$$D_{Upper\ d2} \leq 900 \tag{8e}$$

$$D_{Lower\ d1} \geq -100 \tag{8f}$$

$$D_{Lower\ d2} \geq 70 \tag{8g}$$

In the conditional inequalities (8d) to (8g), $D_{Upper\ d1}$ denotes the upper-limit of dispersion in the demand 1, $D_{Upper\ d2}$ denotes the upper-limit of dispersion in the demand 2, $D_{Lower\ d1}$ denotes the lower-limit of dispersion in the demand 1, and $D_{Lower\ d2}$ denotes the lower-limit of dispersion in the demand 2.

The objective function is minimized so that the sum Qtotal of the Q value of the part selected for the span Sp1 and the Q value of the part selected for the span Sp2 becomes as close as possible to the target value Qth (=40). The inequalities (2a) and (2b) can be written as follows.

$$Q\text{total} + \text{negError} \geq Q\text{th}(=40) \tag{8h}$$

$$Q\text{total} - \text{posError} \leq Q\text{th}(=40) \tag{8i}$$

Details of the calculation are explained row by row below with reference to FIG. 14, which indicates a matrix representation for calculation.

In the row for the objective function, the inner product of the row vector (0, 0, 0, 0, 0, 0, 0, 0, 0, 0, 1, 1) and the column vector $(S_1, S_2, S_3, S_4, S_5, S_6, S_7, S_8, S_9, S_{10},$ negError, posError), i.e., $(0 \times S_1 + 0 \times S_2 + 0 \times S_3 + 0 \times S_4 + 0 \times S_5 + 0 \times S_6 + 0 \times S_7 + 0 \times S_8 + 0 \times S_9 + 0 \times S_{10} + 1 \times \text{negError} + 1 \times \text{posError}) = (\text{negError} + \text{posError})$, is obtained as the objective function to be minimized.

In the row for the upper-limit value of dispersion in the demand 1, the inner product of the row vector (45, 50, 40, 40, 50, 0, 0, 0, 0, 0, 0, 0) and the column vector $(S_1, S_2, S_3, S_4, S_5, S_6, S_7, S_8, S_9, S_{10},$ negError, posError), i.e., $(45 \times S_1 + 50 \times S_2 + 40 \times S_3 + 40 \times S_4 + 50 \times S_5 + 0 \times S_6 + 0 \times S_7 + 0 \times S_8 + 0 \times S_9 + 0 \times S_{10} + 0 \times \text{negError} + 0 \times \text{posError}) = (45S_1 + 50S_2 + 40S_3 + 40S_4 + 50S_5)$, is obtained. Thus, the following inequality (9a) is obtained.

$$45S_1 + 50S_2 + 40S_3 + 40S_4 + 50S_5 \leq 1000 \tag{9a}$$

In the row for the upper-limit value of dispersion in the demand 2, the inner product of the row vector (45, 50, 40, 40, 50, 15, 18, 15, 20, 25, 0, 0) and the column vector $(S_1, S_2, S_3, S_4, S_5, S_6, S_7, S_8, S_9, S_{10},$ negError, posError), i.e., $(45 \times S_1 + 50 \times S_2 + 40 \times S_3 + 40 \times S_4 + 50 \times S_5 15 \times S_6 + 18 \times S_7 + 15 \times S_8 + 20 \times S_9 + 25 \times S_{10} + 0 \times \text{negError} + 0 \times \text{posError}) = (45S_1 + 50S_2 + 40S_3 + 40S_4 + 50S_5 + 15S_6 + 18S_7 + 15S_8 + 20S_9 + 25S_{10})$, is obtained. Thus, the following inequality (9b) is obtained.

$$45S_1 + 50S_2 + 40S_3 + 40S_4 + 50S_5 + 15S_6 + 18S_7 + 15S_8 + 20S_9 + 25S_{10} \leq 900 \tag{9b}$$

In the row for the lower-limit value of dispersion in the demand 1, the inner product of the row vector (0, 5, 0, 10, 0, 0, 0, 0, 0, 0, 0, 0) and the column vector $(S_1, S_2, S_3, S_4, S_5, S_6, S_7, S_8, S_9, S_{10},$ negError, posError), i.e., $(0 \times S_1 + 5 \times S_2 + 0 \times S_3 +$ $10\times S_4 0\times S_5 0\times S_6+0\times S_7+0\times S_8+0\times S_9+0\times S_{10}+0\times \text{negError}+0\times \text{posError})=(5S_2+10S_4)$, is obtained. Thus, the following inequality (9c) is obtained.

$$5S_2+10S_4 \geqq -100 \qquad (9c)$$

In the row for the lower-limit value of dispersion in the demand 2, the inner product of the row vector (0, 5, 0, 10, 0, 5, −3, 5, 2, 5, 0, 0) and the column vector ($S_1$, $S_2$, $S_3$, $S_4$, $S_5$, $S_6$, $S_7$, $S_8$, $S_9$, $S_{10}$, negError, posError), i.e., ($0\times S_1+5\times S_2+0\times S_3+10\times S_4+0\times S_5+5\times S_6+(-3)\times S_7+5\times S_8+2\times S_9+5\times S_{10}+0\times \text{negError}+0\times \text{posError})$ $(5S_2+10S_4+5S_6-3S_7+5S_8+2S_9+5S_{10})$, is obtained. Thus, the following inequality (9d) is obtained.

$$5S_2+10S_4+5S_6-3S_7+5S_8+2S_9+5S_{10} \geqq -70 \qquad (9d)$$

In the row for the Q value in the demand 1, the inner product of the row vector (25, 23, 18, 20, 22, 0, 0, 0, 0, 0, 0, 0) and the column vector ($S_1$, $S_2$, $S_3$, $S_4$, $S_5$, $S_6$, $S_7$, $S_8$, $S_9$, $S_{10}$, negError, posError), i.e., ($25\times S_1+23\times S_2+18\times S_3+20\times S_4+22\times S_5+0\times S_6+0\times S_7 0\times S_8+0\times S_9+0\times S_{10}+0\times \text{negError}+0\times \text{posError})=(25S_1+23S_2+18S_3+20S_4+22S_5)$, is obtained. Thus, the following inequality (9e) is obtained.

$$25S_1+23S_2+18S_3+20S_4+22S_5 \leqq 40 \qquad (9e)$$

In the row for the Q value in the demand 2, the inner product of the row vector (25, 23, 18, 20, 22, 25, 23, 18, 20, 22, 0, 0) and the column vector ($S_1$, $S_2$, $S_3$, $S_4$, $S_5$, $S_6$, $S_7$, $S_8$, $S_9$, $S_{10}$, negError, posError), i.e., ($25\times S_1+23\times S_2+18\times S_3+20\times S_4+22\times S_5+25\times S_6+23\times S_7+18\times S_8+20\times S_9+22\times S_{10}+0\times \text{negError}+0\times \text{posError})=(25S_1+23S_2+18S_3+20S_4+22S_5+25S_6+23S_7+18S_8+20S_9+22S_{10})$, is obtained. Thus, the following inequality (9f) is obtained.

$$25S_1+23S_2+18S_3+20S_4+22S_5+25S_6+23S_7+18S_8+20S_9+22S_{10} \leqq 40 \qquad (9f)$$

In the row for the PMD value in the demand 1, the inner product of the row vector (8, 6, 4, 2, 1, 0, 0, 0, 0, 0, 0, 0) and the column vector ($S_1$, $S_2$, $S_3$, $S_4$, $S_5$, $S_6$, $S_7$, $S_8$, $S_9$, $S_{10}$, negError, posError), i.e., ($8\times S_1+6\times S_2+4\times S_3+2\times S_4 1\times S_5+0\times S_6+0\times S_7+0\times S_8+0\times S_9+0\times S_{10}+0\times \text{negError}+0\times \text{posError})=(8S_1+6S_2+4S_3+2S_4+S_5)$, is obtained. Thus, the following inequality (9g) is obtained.

$$8S_1+6S_2+4S_3+2S_4+S_5 \leqq 10 \qquad (9g)$$

In the row for the PMD value in the demand 2, the inner product of the row vector (8, 6, 4, 2, 1, 8, 6, 4, 2, 1, 0, 0) and the column vector ($S_1$, $S_2$, $S_3$, $S_4$, $S_5$, $S_6$, $S_7$, $S_8$, $S_9$, $S_{10}$, negError, posError), i.e., ($8\times S_1+6\times S_2+4\times S_3+2\times S_4+1\times S_5+8\times S_6+6\times S_7+4\times S_8+2\times S_9+1\times S_{10}+0\times \text{negError}+0\times \text{posError})=(8S_1+6S_2+4S_3+2S_4+S_5+8S_6+6S_7+4S_8+2S_9+S_{10})$, is obtained. Thus, the following inequality (9g) is obtained.

$$8S_1+6S_2+4S_3+2S_4+S_5+8S_6+6S_7+4S_8+2S_9+S_{10} \leqq 10 \qquad (9h)$$

In the row for the XT value in the demand 1, the inner product of the row vector (1, 2, 3, 4, 5, 0, 0, 0, 0, 0, 0, 0) and the column vector ($S_1$, $S_2$, $S_3$, $S_4$, $S_5$, $S_6$, $S_7$, $S_8$, $S_9$, $S_{10}$, negError, posError), i.e., ($1\times S_1+2\times S_2+3\times S_3+4\times S_4+5\times S_5+0\times S_6+0\times S_7+0\times S_8+0\times S_9 0\times S_{10}+0\times \text{negError}+0\times \text{posError})=(S_1+2S_2+3S_3+4S_4+5S_5)$, is obtained. Thus, the following inequality (9i) is obtained.

$$S_1+2S_2+3S_3+4S_4+5S_5 \leqq 8 \qquad (9i)$$

In the row for the XT value in the demand 2, the inner product of the row vector (1, 2, 3, 4, 5, 1, 2, 3, 4, 5, 0, 0) and the column vector ($S_1$, $S_2$, $S_3$, $S_4$, $S_5$, $S_6$, $S_7$, $S_8$, $S_9$, $S_{10}$, negError, posError), i.e., ($1\times S_1+2\times S_2+3\times S_3+4\times S_4+5\times S_5+1\times S_6+2\times S_7+3\times S_8+4\times S_9+5\times S_{10}+0\times \text{negError}+0\times \text{posError})=$
$(S_1+2S_2+3S_3+4S_4+5S_5+S_6+2S_7+3S_8+4S_9+5S_{10})$, is obtained. Thus, the following inequality (9j) is obtained.

$$S_1+2S_2+3S_3+4S_4+5S_5+S_6+2S_7+3S_8+4S_9+5S_{10} \leqq 8 \qquad (9j)$$

In the row for the span (constraint) condition on the span Sp1, the inner product of the row vector (1, 1, 1, 1, 1, 0, 0, 0, 0, 0, 0, 0) and the column vector ($S_1$, $S_2$, $S_3$, $S_4$, $S_5$, $S_6$, $S_7$, $S_8$, $S_9$, $S_{10}$, negError, posError), i.e., ($1\times S_1+1\times S_2+1\times S_3+1\times S_4+1\times S_5+0\times S_6+0\times S_7+0\times S_8+0\times S_9+0\times S_{10}+0\times \text{negError}+0\times \text{posError})=(S_1+S_2+S_3+S_4+S_5)$, is obtained. Thus, the following equation (9k) is obtained.

$$S_1+S_2+S_3+S_4+S_5=1 \qquad (9k)$$

In the row for the span (constraint) condition on the span Sp2, the inner product of the row vector (0, 0, 0, 0, 0, 1, 1, 1, 1, 1, 0, 0) and the column vector ($S_1$, $S_2$, $S_3$, $S_4$, $S_5$, $S_6$, $S_7$, $S_8$, $S_9$, $S_{10}$, negError, posError), i.e., ($0\times S_1+0\times S_2+0\times S_3+0\times S_4+0\times S_5+1\times S_6+1\times S_7+1\times S_8+1\times S_9+1\times S_{10}+0\times \text{negError}+0\times \text{posError})=(S_6+S_7+S_8+S_9+S_{10})$, is obtained. Thus, the following equation (9m) is obtained.

$$S_6+S_7+S_8+S_9+S_{10}=1 \qquad (9m)$$

In the row for the constraint imposed on the Qtotal value in the demand 2 on the negative side of the Qth value, the inner product of the row vector (25, 23, 18, 20, 22, 25, 23, 18, 20, 22, 1, 0) and the column vector ($S_1$, $S_2$, $S_3$, $S_4$, $S_5$, $S_6$, $S_7$, $S_8$, $S_9$, $S_{10}$, negError, posError), i.e., ($25\times S_1+23\times S_2+18\times S_3+20\times S_4+22\times S_5+25\times S_6+23\times S_7+18\times S_8+20\times S_9+22\times S_{10}+1\times \text{negError}+0\times \text{posError})=(25S_1+23S_2+18S_3+20S_4+22S_5+25S_6+23S_7+18S_8+20S_9+22S_{10}+\text{negError})$, is obtained. Thus, the following inequality (9n) is obtained.

$$25S_1+23S_2+18S_3+20S_4+22S_5+25S_6+23S_7+18S_8+20S_9+22S_{10}+\text{negError} \geqq 40 \qquad (9n)$$

In the row for the constraint imposed on the Qtotal value in the demand 2 on the positive side of the Qth value, the inner product of the row vector (25, 23, 18, 20, 22, 25, 23, 18, 20, 22, 0, −1) and the column vector ($S_1$, $S_2$, $S_3$, $S_4$, $S_5$, $S_6$, $S_7$, $S_8$, $S_9$, $S_{10}$, negError, posError), i.e., ($25\times S_1+23\times S_2+18\times S_3+20\times S_4+22\times S_5+25\times S_6+23\times S_7+18\times S_8+20\times S_9+22\times S_{10}+0\times \text{negError}+(-1)\times \text{posError})=(25S_1+23S_2+18S_3+20S_4+22S_5+25S_6+23S_7+18S_8+20S_9+22S_{10}-\text{posError})$, is obtained. Thus, the following inequality (9o) is obtained.

$$25S_1+23S_2+18S_3+20S_4+22S_5+25S_6+23S_7+18S_8+20S_9+22S_{10}-\text{posError} \leqq 40 \qquad (9o)$$

Thus, a solution satisfying the above inequalities or equations (9a) to (9o) (i.e., a solution satisfying the inequalities or equations (8a) to (8i)) is obtained by linear programming as ($S_1$, $S_2$, $S_3$, $S_4$, $S_5$, $S_6$, $S_7$, $S_8$, $S_9$, $S_{10}$, negError, posError)=(0, 0, 0, 0, 1, 0, 0, 1, 0, 0, 0, 0). That is, $S_5=S_6=1$, and all the other elements in the solution are zero. Therefore, in the optical network 1c, the part #5 for the span Sp1 and the part #8 for the span Sp2 are selected. Although the object of the linear programming is initially to seek a solution having the Qtotal closest to the target value Qth (40), the obtained solution indicates that negError=posError=0. That is, parts for the spans Sp1 and Sp2 are selected so that the Qtotal value is equal to the target value Qth. (Specifically, Q value of the part #5 is 22, and the Q value of the part #8 is 18.)

According to the present invention, it is possible to optimumly design an optical network having desired characteristics.

8. Additional Matters

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has(have) been described in detail, it should be understood that various changes, substitutions and alterations could be made hereto without departing from the spirit and scope of the invention.

What is claimed is:

1. An optical network designing apparatus comprising a processor configured to perform a procedure including:

holding values of one or more optical-transmission parameters corresponding to one or more components constituting said optical network;

generating a plurality of design candidates for a part to be arranged in each of one or more spans between nodes of the optical network so that each of the plurality of design candidates contains at least one of said one or more components;

making a selection, for said each of the one or more spans, of one of the plurality of design candidates which has at least one value of at least one of said one or more optical-transmission parameters satisfying a design condition;

constructing the optical network by combining one or more parts each of which is selected by said making; and performing a quality examination of one or more functions for designing said optical network, wherein the performing selects a predetermined one of said one or more optical-transmission parameters, seeks a value of the predetermined one of the one or more optical-transmission parameters at a limit of normal transmission by varying the predetermined one of the one or more optical-transmission parameters in said optical network constructed by the constructing, calculates a first value of a predetermined characteristic at a first point in a range of the predetermined one of the one or more optical-transmission parameters enabling the normal transmission, calculates a second value of the characteristic value at a second point out of the range of the predetermined one of the one or more optical-transmission parameters enabling the normal transmission, compares the first value of the predetermined characteristic with an expected value of the predetermined characteristic at the first point, and compares the second value of the predetermined characteristic with an expected value of the predetermined characteristic at a second point, and when the first value of the predetermined characteristic is determined to be identical to the expected value of the predetermined characteristic at the first point and the second value of the predetermined characteristic is determined to be identical to the expected value of the predetermined characteristic at the second point, the performing outputs a notice that the constructed optical network has satisfactory quality.

2. The apparatus according to claim 1, wherein said constructing changes said at least one of the one or more optical-transmission parameters by a small amount when the constructing determines that a transmission characteristic of said optical network constituted by said one or more parts is in a range in which normal optical transmission can be realized, and is not in a vicinity of a limit of normal optical transmission, and said making makes said selection again from among the plurality of design candidates in which the at least one of the one or more optical-transmission parameters is changed by a small amount.

3. The apparatus according to claim 1, wherein said holding holds said one or more optical-transmission parameters in numeric form, the one or more optical-transmission parameters include one or more fiber-related parameters, one or more component-related parameters, and one or more calculation parameters, the one or more fiber-related parameters include at least one of a fiber type, a fiber length, a fiber loss value, and a fiber dispersion value, the one or more component-related parameters include at least one of a node type, a postamplifier type, a preamplifier type, and a DCM (dispersion compensation module) type, the one or more calculation parameters include at least one of a noise value, a dispersion value, a PMD (polarization mode dispersion) value, an XT (cross talk) value, and an optical-filter loss value, and said generates said plurality of design candidates by using said values of the one or more optical-transmission parameters held by said holding so that one or more values of one or more optical-transmission parameters corresponding to one or more components contained in each of the plurality of design candidates are different from one or more values of one or more optical-transmission parameters corresponding to one or more components contained in all other ones of the plurality of design candidates.

4. The apparatus according to claim 1, wherein said making selects said plurality of candidate parts for forming a path which is constituted by said one or more spans and through which optical transmission can be performed with a noise characteristic corresponding to a total noise index value in a vicinity of a target value of the total noise index value by obtaining a solution $(S_1, S_2, \ldots, S_k, \text{negError}, -\text{posError})$ which minimizes a sum of negError and posError and satisfies both conditional inequalities, $$Q_1 \cdot S_1 + Q_2 \cdot S_2 + \ldots + Q_k \cdot S_k + \text{negError} \geq Q\text{th, and}$$

$$Q_1 \cdot S_1 + Q_2 \cdot S_2 + \ldots + Q_k \cdot S_k - \text{posError} \leq Q\text{th,}$$

where $Q_1, Q_2, \ldots$ and $Q_k$ are noise index values of the plurality of candidate parts for said one or more spans, $S_1, S_2, \ldots$ and $S_k$ each indicate a state of selection of a corresponding one of the plurality of candidate parts for the one or more spans, each of $S_1, S_2, \ldots$ and $S_k$ is equal to one when a candidate part corresponding to said each of $S_1, S_2, \ldots$ and $S_k$ is selected for a corresponding span, and is equal to zero when the candidate part corresponding to said each of $S_1, S_2, \ldots$ and $S_k$ is not selected for the corresponding span, Qth is the target value of the total noise index value, negError is a tolerance of the total noise index value on the negative side of the target value of the total noise index value, and posError is a tolerance of the total noise index value on the positive side of the target value of the total noise index value.

5. An optical network designing method executed by a processor, the method comprising:

holding values of one or more optical-transmission parameters corresponding to one or more components constituting said optical network;

generating a plurality of design candidates for a part to be arranged in each of one or more spans between nodes of the optical network so that each of the plurality of design candidates contains at least one of said one or more components;

making a selection, for said each of the one or more spans, of one of the plurality of design candidates which has at least one value of at least one of said one or more optical-transmission parameters satisfying a design condition;

constructing the optical network by combining one or more parts each of which is selected; and examining quality of one or more functions for designing said optical network, the examining includes selecting a predetermined one of said one or more optical-transmission parameters, seeking a value of the predetermined one of the one or more optical-transmission parameters at a limit of normal transmission by varying the predetermined one of the one or more optical-transmission parameters in said optical network constructed by the constructing, calculating a first value of a predetermined characteristic at a first point in a range of the predetermined one of the one or more optical-transmission parameters enabling the normal transmission, calculating a second value of the characteristic value at a second point out of the range of the predetermined one of the one or more optical-transmission parameters enabling the normal transmission, comparing the first value of the predetermined characteristic with an expected value of the predetermined characteristic at the first point, and comparing the second value of the predetermined characteristic with an expected value of the predetermined characteristic at the second point, and the examining further includes outputting a notice of satisfactory quality of the constructed optical network when the first value of the predetermined characteristic is determined to be identical to the expected value of the predetermined characteristic at the first point and the second value of the predetermined characteristic is determined to be identical to the expected value of the predetermined characteristic at the second point.

6. The method according to claim 5, wherein said constructing includes changing said at least one of the one or more optical-transmission parameters by a small amount when it is determined that a transmission characteristic of said optical network constituted by said one or more parts is in a range in which normal optical transmission can be realized, and is not in a vicinity of a limit of normal optical transmission, and said selection is made again from among the plurality of design candidates in which the at least one of the one or more optical-transmission parameters is changed by a small amount.

7. The method according to claim 5, wherein said holding includes holding said one or more optical-transmission parameters in numeric form, the one or more optical-transmission parameters include one or more fiber-related parameters, one or more component-related parameters, and one or more calculation parameters, the one or more fiber-related parameters include at least one of a fiber type, a fiber length, a fiber loss value, and a fiber dispersion value, the one or more component-related parameters include at least one of a node type, a postamplifier type, a preamplifier type, and a DCM (dispersion compensation module) type, the one or more calculation parameters include at least one of a noise value, a dispersion value, a PMD (polarization mode dispersion) value, an XT (cross talk) value, and an optical-filter loss value, and said generating includes generating said plurality of design candidates by using the held values of the one or more optical-transmission parameters so that one or more values of one or more optical-transmission parameters corresponding to one or more components contained in each of the plurality of design candidates are different from one or more values of one or more optical-transmission parameters corresponding to one or more components contained in all other ones of the plurality of design candidates.

8. The method according to claim 5, wherein said selecting includes selecting said plurality of candidate parts for forming a path which is constituted by said one or more spans and through which optical transmission can be performed with a noise characteristic corresponding to a total noise index value in a vicinity of a target value of the total noise index value by obtaining a solution ($S_1, S_2, \ldots, S_k$, negError, −posError) which minimizes a sum of negError and posError and satisfies both conditional inequalities, $$Q_1 \cdot S_1 + Q_2 \cdot S_2 + \ldots + Q_k \cdot S_k + \text{negError} \geq Q\text{th, and}$$

$$Q_1 \cdot S_1 + Q_2 \cdot S_2 + \ldots + Q_k \cdot S_k - \text{posError} \leq Q\text{th,}$$

where $Q_1, Q_2, \ldots$ and $Q_k$ are noise index values of the plurality of candidate parts for said one or more spans, $S_1, S_2, \ldots$ and $S_k$ each indicate a state of selection of a corresponding one of the plurality of candidate parts for the one or more spans, each of $S_1, S_2, \ldots$ and $S_k$ is equal to one when a candidate part corresponding to said each of $S_1, S_2, \ldots$ and $S_k$ is selected for a corresponding span, and is equal to zero when the candidate part corresponding to said each of $S_1, S_2, \ldots$ and $S_k$ is not selected for the corresponding span, Qth is the target value of the total noise index value, negError is a tolerance of the total noise index value on the negative side of the target value of the total noise index value, and posError is a tolerance of the total noise index value on the positive side of the target value of the total noise index value.

* * * * *

UNITED STATES PATENT AND TRADEMARK OFFICE
CERTIFICATE OF CORRECTION

PATENT NO. : 8,406,626 B2  
APPLICATION NO. : 12/801899  
DATED : March 26, 2013  
INVENTOR(S) : Yutaka Takita et al.

Page 1 of 1

It is certified that error appears in the above-identified patent and that said Letters Patent is hereby corrected as shown below:

In the Claims:
Column 21, Line 62, In Claim 2, after "making" delete "makes".
Column 21, Line 67, In Claim 3, before "said" delete "holds".
Column 22, Line 13, In Claim 3, change "generates" to --generating--.
Column 24, Line 29 (Approx.), In Claim 8, change "$Q_1, Q_z$," to --$Q_1, Q_2$,--.

Signed and Sealed this
Sixteenth Day of July, 2013

Teresa Stanek Rea
*Acting Director of the United States Patent and Trademark Office*